United States Patent
Saha et al.

(10) Patent No.: US 9,092,227 B2
(45) Date of Patent: Jul. 28, 2015

(54) VECTOR SLOT PROCESSOR EXECUTION UNIT FOR HIGH SPEED STREAMING INPUTS

(76) Inventors: Anindya Saha, Karnataka (IN);
Gururaj Padaki, Karnataka (IN);
Santosh Billava, Karnataka (IN);
Rakesh A. Joshi, Karnataka (IN)

(*) Notice: Subject to any disclaimer, the term of this patent is extended or adjusted under 35 U.S.C. 154(b) by 602 days.

(21) Appl. No.: 13/462,144

(22) Filed: May 2, 2012

(65) Prior Publication Data

US 2012/0284487 A1  Nov. 8, 2012

(30) Foreign Application Priority Data

May 2, 2011  (IN) .......................... 1509/CHE/2011

(51) Int. Cl.
| | |
|---|---|
| G06F 15/76 | (2006.01) |
| G06F 9/302 | (2006.01) |
| G06F 9/38 | (2006.01) |
| G06F 9/30 | (2006.01) |
| G06F 7/58 | (2006.01) |
| G06F 15/80 | (2006.01) |
| H04L 25/03 | (2006.01) |
| H04L 27/00 | (2006.01) |

(52) U.S. Cl.
CPC .............. *G06F 9/3887* (2013.01); *G06F 7/586* (2013.01); *G06F 9/3001* (2013.01); *G06F 9/30109* (2013.01); *G06F 9/3893* (2013.01); *G06F 15/8053* (2013.01); *G06F 15/8076* (2013.01); *H04L 25/03019* (2013.01); *H04L 27/0008* (2013.01)

(58) Field of Classification Search
CPC ....................................................... G06F 9/38
USPC ............................................................ 712/36
See application file for complete search history.

(56) References Cited

U.S. PATENT DOCUMENTS

| | | | |
|---|---|---|---|
| 5,600,582 A | 2/1997 | Miyaguchi | |
| 5,864,703 A * | 1/1999 | van Hook et al. | ............... 712/22 |
| 6,366,998 B1 * | 4/2002 | Mohamed | ....................... 712/17 |
| 6,512,468 B1 | 1/2003 | Zhong | |
| 6,910,123 B1 * | 6/2005 | Bosshart | ....................... 712/226 |
| 7,248,189 B2 | 7/2007 | Sinha et al. | |
| 7,619,546 B2 | 11/2009 | McGrath | |
| 2004/0078403 A1 * | 4/2004 | Scheuermann et al. | ....... 708/322 |
| 2008/0244220 A1 * | 10/2008 | Lin et al. | ............................ 712/4 |
| 2009/0070544 A1 * | 3/2009 | Zeng | ............................. 711/202 |

* cited by examiner

*Primary Examiner* — Boris Gorney
*Assistant Examiner* — Michael Metzger
(74) *Attorney, Agent, or Firm* — The Law Office of Austin Bonderer, PC

(57) ABSTRACT

A vector slot processor that is capable of supporting multiple signal processing operations for multiple demodulation standards is provided. The vector slot processor includes a plurality of micro execution slot (MES) that performs the multiple signal processing operations on the high speed streaming inputs. Each of the MES includes one or more n-way signal registers that receive the high speed streaming inputs, one or more n-way coefficient registers that store filter coefficients for the multiple signal processing, and one or more n-way Multiply and Accumulate (MAC) units that receive the high speed streaming inputs from the one or more n-way signal registers and filter coefficients from one or more n-way coefficient registers. The one or more n-way MAC units perform a vertical MAC operation and a horizontal multiply and add operation on the high speed streaming inputs.

8 Claims, 17 Drawing Sheets

| Register name == | Signal-Buffer-Interconnect Switch-Configuration Register => | |
|---|---|---|
| This Control register is specially used for Configuring how the Signal Registers Ds0, Ds1, Ds2, Ds3, Ds4, Ds5, Ds6, Ds7 and Buffer Registers Di0, Di1, Di2 and Di3 are connected within each other for different filtering functions. A specific "active" connection configuration implies that the link setup enables shift of all types (i.e. 1 sample, 2samples and 4 samples) once they are configured.<br>This register must be programmed at least - 2 cycles before its effect takes place.<br>There are 11 switches SW0-SW10 which control the interconnect between Dsx, Dix registers.<br>SW0 register controls the incoming shifted values to Ds0.<br>SW1 register controls the incoming shifted values to Ds1.<br>SW2 register controls the incoming shifted values to Ds2.<br>SW3 register controls the incoming shifted values to Ds3.<br>SW4 register controls the incoming shifted values to Ds4.<br>SW5 register controls the incoming shifted values to Ds5.<br>SW6 register controls the incoming shifted values to Ds6.<br>SW7 register controls the incoming shifted values to Ds7.<br>SW8 register controls the incoming shifted values to Di0.<br>SW9 register controls the incoming shifted values to Di1.<br>SW10 register controls the incoming shifted values to Di2.<br>Two bits are assigned per switch control and the functions of these are listed below. | | |
| Bit 1-0 | SW0 Control | 00 - Disconnected,<br>01 - Connected to output of Ds1,<br>10 - Connected to output of Di3,<br>11 - Connected to output of Di3. |
| Bit 3-2 | SW1 Control | 00 - Disconnected,<br>01 - Connected to output of Ds2,<br>10 - Connected to output of Di3,<br>11 - Connected to output of Di1. |
| Bit 5-4 | SW2 Control | 00 - Disconnected,<br>01 - Connected to output of Ds3,<br>10 - Connected to output of Di2,<br>11 - Connected to output of Di2. |
| Bit 7-6 | SW3 Control | 00 - Disconnected,<br>01 - Connected to output of Ds4,<br>10 - Connected to output of Di2,<br>11 - Connected to output of Di0. |
| Bit 9-8 | SW4 Control | 00 - Disconnected,<br>01 - Connected to output of Ds5,<br>10 - Connected to output of Di1,<br>11 - Connected to output of Di1. |
| Bit 11-10 | SW5 Control | 00 - Disconnected,<br>01 - Connected to output of Ds6,<br>10 - Connected to output of Di1,<br>11 - Connected to output of Di1. |
| Bit 13-12 | SW6 Control | 00 - Disconnected,<br>01 - Connected to output of Ds7,<br>10 - Connected to output of Di0,<br>11 - Connected to output of Di0. |
| Bit 15-14 | SW7 Control | 00 - Disconnected,<br>01 - Connected to output of Di0,<br>10 - Connected to output of Di0,<br>11 - Connected to output of Di0. |
| Bit 17-16 | SW8 Control | 00 - Disconnected,<br>01 - Connected to output of Di1,<br>10 - Connected to output of Di1,<br>11 - Connected to output of Di1. |
| Bit 19-18 | SW9 Control | 00 - Disconnected,<br>01 - Connected to output of Di2,<br>10 - Connected to output of Di2,<br>11 - Connected to output of Di2. |
| Bit 21-20 | SW10 Control | 00 - Disconnected,<br>01 - Connected to output of Di3,<br>10 - Connected to output of Di3,<br>11 - Connected to output of Di3. |
| Bit 7-6 | Reserved (=10'h0) | |

FIG. 7

The following 4 coefficients are generated using the Cubic Polynomials as shown.
C0 = (a4+ a3*frac+a2*frac^2 + a1*frac^3)
C1 = (b4+ b3*frac+b2*frac^2 + b1*frac^3)
C2 = (c4+ c3*frac+c2*frac^2 + c1*frac^3)
C3 = (d4+ d3*frac+d2*frac^2 + d1*frac^3).

The Coefficients a4,a3,a2,a1,b4,b3,b2,b1,c4,c3,c2,c1,d4,d3,d2,d1 are stored as Q.15 formatted numbers. This is done in 8- CPU Control registers.

| Register name == Polynomial-Interpolation-Reg1 | |
|---|---|
| Bit 15-0 | a1 value used for computing coefficient - C0 |
| Bit 31-16 | a2 value used for computing coefficient - C0 |
| Register name == Polynomial-Interpolation-Reg2 | |
| Bit 15-0 | a3 value used for computing coefficient - C0 |
| Bit 31-16 | a4 value used for computing coefficient - C0 |
| Register name == Polynomial-Interpolation-Reg3 | |
| Bit 15-0 | b1 value used for computing coefficient – C1 |
| Bit 31-16 | b2 value used for computing coefficient – C1 |
| Register name == Polynomial-Interpolation-Reg4 | |
| Bit 15-0 | b3 value used for computing coefficient – C1 |
| Bit 31-16 | b4 value used for computing coefficient – C1 |
| Register name == Polynomial-Interpolation-Reg5 | |
| Bit 15-0 | c1 value used for computing coefficient – C2 |
| Bit 31-16 | c2 value used for computing coefficient – C2 |
| Register name == Polynomial-Interpolation-Reg6 | |
| Bit 15-0 | c3 value used for computing coefficient – C2 |
| Bit 31-16 | c4 value used for computing coefficient – C2 |
| Register name == Polynomial-Interpolation-Reg7 | |
| Bit 15-0 | d1 value used for computing coefficient – C3 |
| Bit 31-16 | d2 value used for computing coefficient – C3 |
| Register name == Polynomial-Interpolation-Reg8 | |
| Bit 15-0 | d3 value used for computing coefficient – C3 |
| Bit 31-16 | d4 value used for computing coefficient – C3 |

FIG. 8

VECTOR SLOT PROCESSOR EXECUTION UNIT FOR HIGH SPEED STREAMING INPUTS

BACKGROUND

1. Technical Field

The embodiments herein generally relate to a vector slot processor, and, more particularly, to a vector slot processor that is capable of performing multiple signal processing operations of finite impulse response filters, decimators, interpolators and cubic polynomial based waveform interpolations for high speed streaming inputs.

2. Description of the Related Art

In digital communication systems, it is essential to convert an incoming intermediate frequency (IF) signal to a baseband signal before further processing. In addition, the baseband signal needs to be filtered before processing any symbol. This is very computationally intensive, especially if the incoming stream of samples is at a high speed. Current application specific hardwired architectures typically support single or very few demodulation standards. This becomes extremely challenging for a software defined radio (SDR) platform that supports multiple demodulation standards. Typical digital signal processing (DSP) CPUs do not provide an optimized and scalable solution that caters to all data rates.

A demodulation chain of any digital communication receiver typically includes a first section where the intermediate frequency (IF) signal is digitized after receiving it from a tuner using an analog to digital convertor (ADC). This digitized signal can be optionally converted to baseband. When there is a need to cater to a specific demodulation receiver, the design features are supported which is optimized for a combination of sample rates (as obtained from ADC) and required symbol rates. Such design features are inflexible and not scalable for higher sampling rates or multiple input streams as is the case for multiple-input and multiple-output (MIMO) communication systems.

SUMMARY

In view of the foregoing, an embodiment herein provides a vector slot processor that is capable of supporting multiple signal processing operations for multiple demodulation standards. The vector slot processor includes a plurality of Micro Execution Slot (MES) that performs the multiple signal processing operations on high speed streaming inputs. Each of the plurality of MES includes (i) one or more n-way signal registers that receive the high speed streaming inputs, (ii) one or more n-way coefficient registers that store filter coefficients for the multiple signal processing, and (iii) one or more n-way Multiply and Accumulate (MAC) units. A n-way Multiply and Accumulator (MAC) unit (a) receives the high speed streaming inputs from the one or more n-way signal registers, (b) receives the filter coefficients from the one or more n-way coefficient registers and (c) performs a vertical MAC (VR-MAC) operation and a horizontal multiply and add (HR-MAD) operation. Each of the plurality of MES may further includes (i) one or more n-way extended precision accumulators (ACCs) that receive and store an output of the n-way MAC unit and (ii) one or more n-way scaled accumulators (SACCs) that receives data from the one or more n-way ACCs and stores the data after performing a scale-down operation and a rounding operation on the data.

The one or more n-way signal registers includes a programmable switch that controls a left shift operation of the high speed streaming inputs across the plurality of MES simultaneously. The multiple signal processing operations may include (i) a filtering operation, (ii) a down-sampling operation, (iii) an up-sampling operation, (iv) a waveform interpolation operation, (v) a cross-correlation and (vi) an auto-correlation operation. The one or more n-way signal registers and the one or more n-way coefficient registers may perform an indexing operation that enables each of the one or more n-way signal registers and the one or more n-way way coefficient registers to be used as a scalar register as well as a vector register. A width of the one or more n-way signal registers and a width of the one or more n-way coefficient registers may be scaled with the one or more n-way Multiply and Accumulate (MAC) units. The width of the one or more n-way signal registers and the one or more n-way coefficient register may be extendible based on a number of the plurality of MES.

The vector slot processor may further include a plurality of buffer registers that are interconnected with the one or more n-way signal registers and across the plurality of MES using a programmable interconnection. In one embodiment, a vector instruction for the vector slot processor is stored in a program memory of a CPU. The plurality of MES may include a first MES that executes a first operand of the vector instruction and a second MES that executes a second operand of the vector instruction concurrently. In another embodiment, a format of the vector instruction includes a field that stores a programmable binary value. A clock of the plurality of MES is disabled or enabled based on the programmable binary value.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 7 illustrates a layout of CPU control registers according to a first embodiment herein;

FIG. 8 illustrates a layout of CPU control registers according to a second embodiment herein;

DETAILED DESCRIPTION OF PREFERRED EMBODIMENTS

Figure 1:
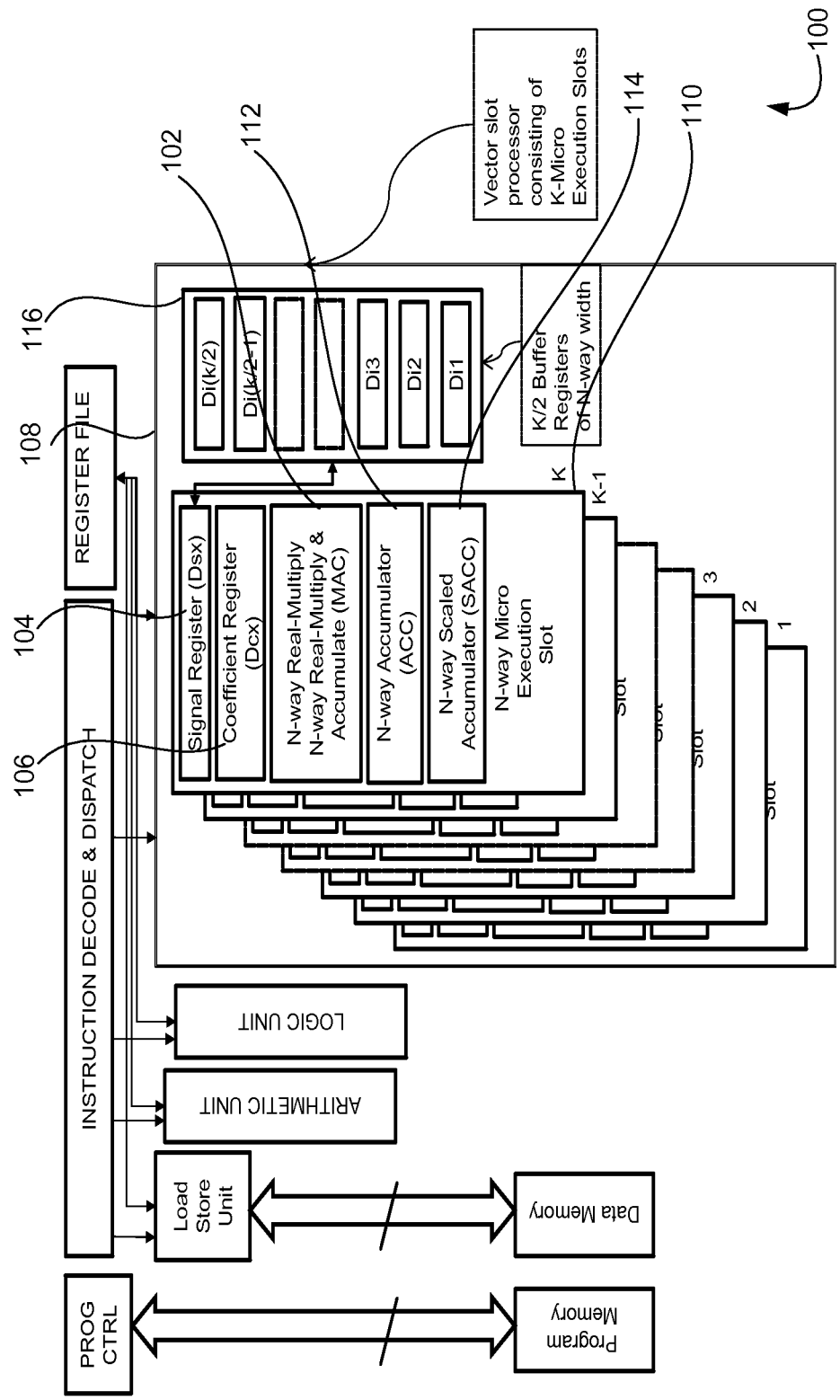
FIG. 1 illustrates an architecture of a CPU subsystem with a vector slot processor, having K-Micro execution slots each of N-ways according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

There remains a need for implementing multiple signal processing operations such as (i) a filtering operation, (ii) a down-sampling operation, (iii) an up-sampling operation, (iv) a waveform interpolation operation, (v) a cross-correlation and (vi) an auto-correlation operation for high speed streaming inputs. The embodiments herein achieve this by providing a flexible, scalable vector slot processor is capable of receiving and processing the high speed streaming inputs from the ranges from Mega Samples per second to Giga samples per second. Referring now to the drawings, and more particularly to FIGS. 1 through 17, where similar reference characters denote corresponding features consistently throughout the figures, preferred embodiments are described herein. The vector slot processor includes one or multiple micro execution slots (MES). Each micro execution slot in turn includes one or more Multiply & Accumulate (MAC) units.

A number of micro execution slots as well as a number of multipliers or MACs for each micro execution slot can be chosen based on an input sample rate that is to be processed, as well as a required output symbol rate. The number of multipliers or MACs present in a micro execution slot may be matched by the same number of signal registers (Dsx) and coefficient registers (Dcx). The signal registers may act as elements which are used for computation as well as for storage. In addition, each MES may include a same number of extended precision accumulators (ACC) and a same number of scaled accumulators (SACC) as a number of MACs. In one embodiment, a bit width of an extended precision accumulator is equal to 40, and it can be determined by the target application.

FIG. 1 illustrates an architecture 100 of a CPU subsystem with a vector slot processor 108 having K-Micro execution slots 110 each of N-ways according to an embodiment herein (where the K>=1 and N>=1). Each of the K-Micro execution slots 110 includes a N-way Multiply & Accumulate (MAC) units 102, N-way signal registers 104, N-way coefficient registers 106, a N-way extended precision accumulator (ACC) 112, and a N-way scaled accumulator (SACC) 114. The vector slot processor 108 may include one or more K/2 buffer registers 116 having an equivalent width of N-ways each and the K/2 buffer registers 116 are interconnected with the N-way signal registers 104 and across the MES 110 using a programmable interconnection. The CPU subsystem includes a program memory that stores vector instructions for vector slot processor 108. The N-way signal registers 104 receives high speed streaming input for multiple signal processing and the N-way Multiply & Accumulate (MAC) units 102 perform (a) a vertical MAC (VRMAC) operation and (b) a horizontal multiply and add (HRMAD) operation on the high speed streaming inputs. The N-way coefficient registers 106 stores the filter coefficients for the multiple signal processing operations.

In one embodiment, a width of the N-way signal registers 104 and a width of the N-way coefficient registers 106 may be scaled with the N-way multiply and Accumulate (MAC) units 102. The width of the N-way signal registers 104 and the N-way coefficient registers 106 may be extendible based on the K-MES 110. The N-way signal registers (Dsx) and the N-way coefficient registers (Dcx) are vector registers and have individual indexes from 1 to N inside the K-MES 110. Therefore each N-bit slice for a given K-MES 110 is also represented as Dsx[1][K], Dsx[2][K], Dsx[3][K], . . . up to Dsx[N][K] and Dcx[1][K], Dcx[2][K], Dcx[3] [K], . . . up to Dcx[N][K]. Scalar instructions ADD, SUB in the vector slot may use these individual N-bit slices for performing the required operations and that enables the signal registers 104 and the coefficient registers 106 to be used as both a scalar register and a vector register. The vector slot processor 108 enables a single instruction to work on different operands in different MESs 110 at the same time. The MES 110 also includes the N-way extended precision Accumulators (ACC) 112 that receives and stores of the N-way MAC units 102 and the N-way scaled accumulators (SACC) 114 that receives from N-way ACC and stores the data after performing a scale-down operation and a rounding operation on the data.

For an N-way configuration, the N slices within the signal register 104 can be left-shifted simultaneously in conjunction with multiply and accumulate functions or multiply and add functions. If the vector slot processor 108 has K-Micro execution slots (MESs) 110 then additional K/2 buffer registers (Dix) 116 are provided. The K/2 buffer registers (Dix) 116 are used for pre-loading of the high speed streaming inputs, so that there is no cycle lost when the signal registers 104 are left shifted inside a tight kernel. Each of the signal registers 104 inside the MES 110 has a programmable switch (not shown in FIG. 1) which is used to control a left shift operation of the content across the K-MES 110 simultaneously which enables an efficient execution of the multiple signal processing filtering operations.

Figure 2:
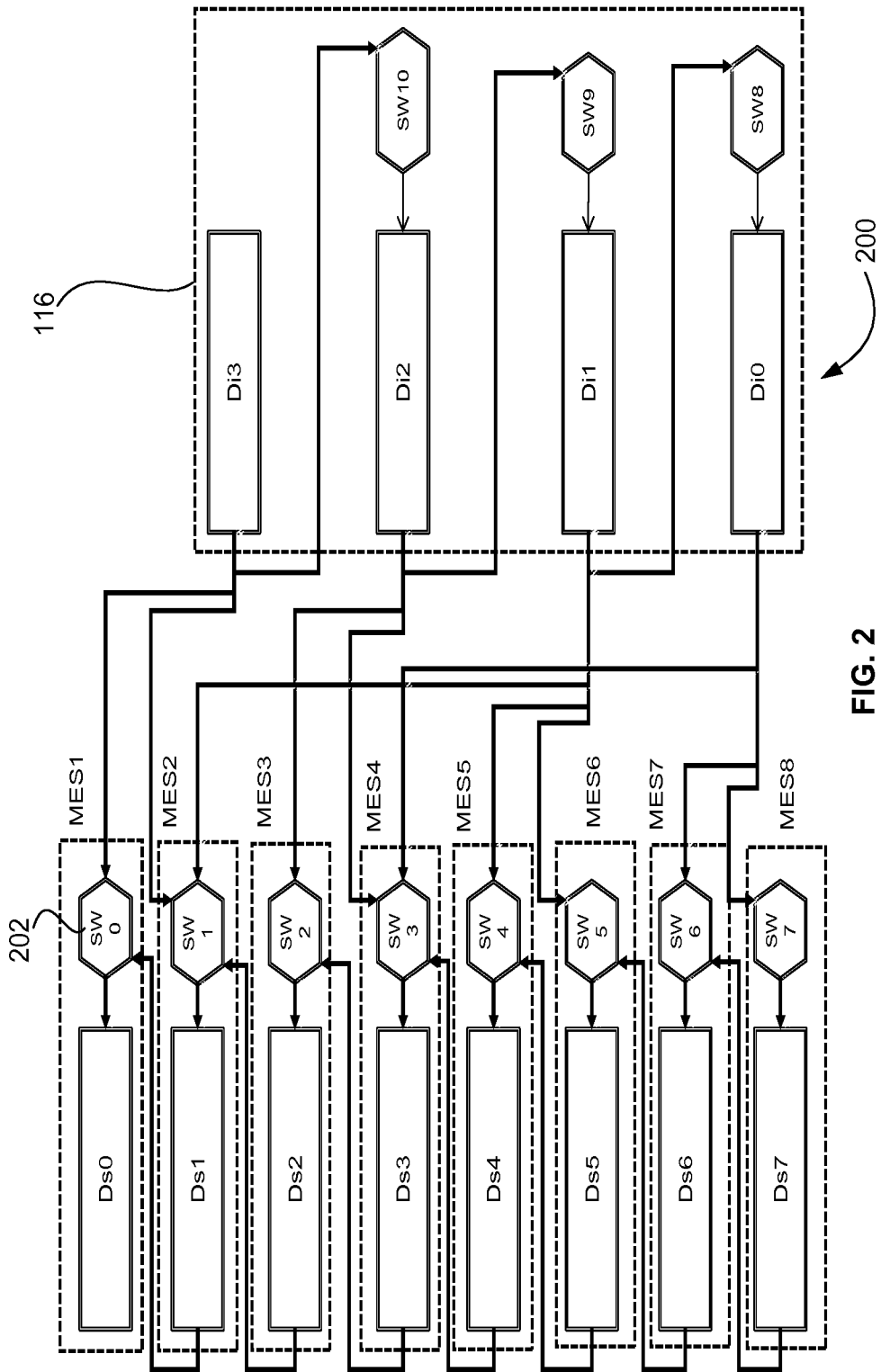
FIG. 2 illustrates an exploded view of the vector slot processor of FIG. 1 having a programmable switch showing a shift path of a N-way signal register with K/2 buffer registers, when a number of micro execution slots is equal to 8 according to an embodiment herein.

FIG. 2 illustrates an exploded view 200 of the vector slot processor 108 having a programmable switch showing a shift path of the N-way signal register 104 of FIG. 1 with K/2 buffer registers 116 of FIG. 1, when a number of micro execution slots is equal to 8 according to an embodiment herein. The same scheme can be extended to the vector slot processor 108 having arbitrary number of micro execution slots. The programmable switches 202 are included in a micro execution slot 110. The switches (SW0, SW1 . . . SW10) are programmed using a CPU control register (not shown). In a typical implementation, both the parameters namely the number of micro execution slots as well as the number of multipliers or MACs for each micro execution slot can be chosen based on an input sample rate and a required output symbol rate.

Figure 3:
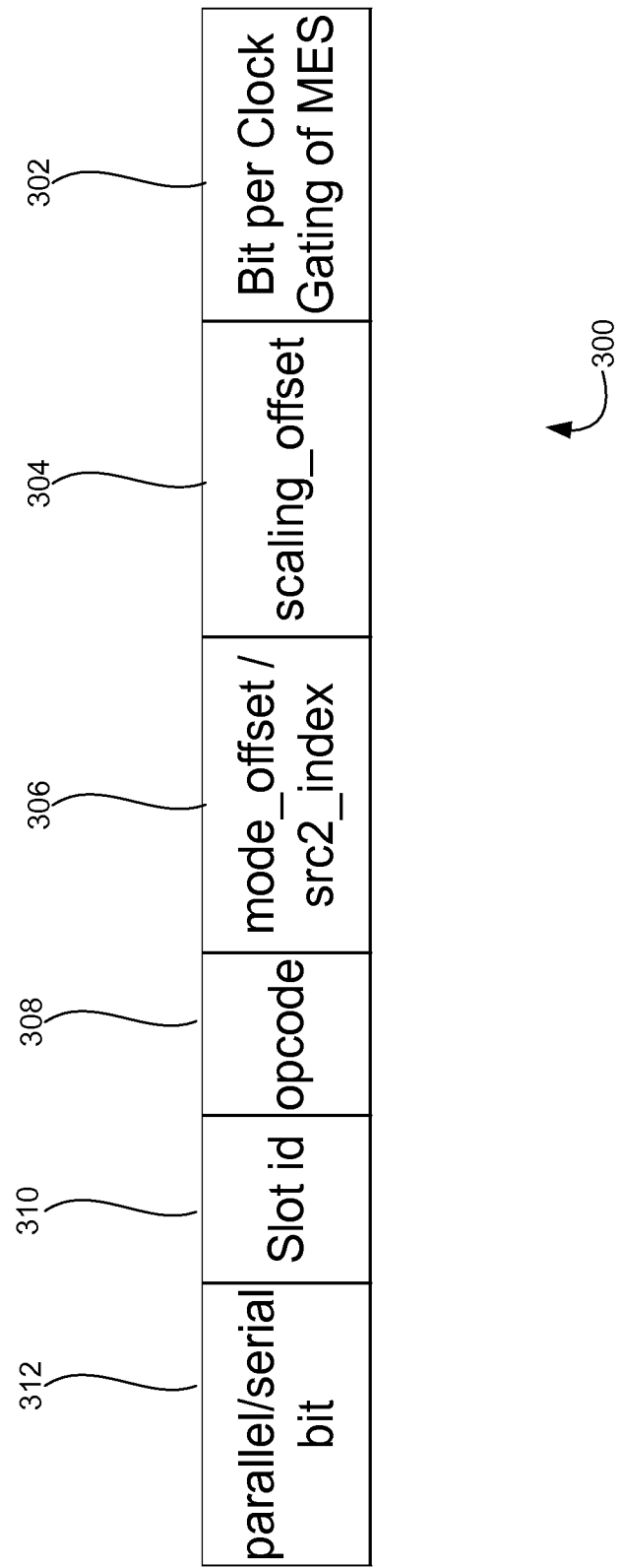
FIG. 3 illustrates a vector instruction format of the vector slot processor of FIG. 1 according to an embodiment herein.

FIG. 3 illustrates a vector instruction format 300 of the vector slot processor 108 of FIG. 1 according to an embodiment herein. The instruction format 300 of vector slot processor 108 includes a bits per clock gating of micro execution slot field 302, a scaling offset field 304, a source src2_index/mode offset field 306, an opcode field 308, a slot identification field 310 and a parallel-serial bit field 312. The vector instructions have a K-bit predicated field corresponding to bit per clock gating of micro execution slot field 302 shown in the instruction definitions, which allows a programmer to disable or shut off the clocks to any of the K-Micro execution slots. The bit per clock gating of micro execution slot field 302 is a programmable binary value.

A least significant bits in the instruction format is the "bits per Clock Gating of MES" field 302. Programming a "0" value in this field will shut off or disable at least one of the clocks of MES 110 and the binary value "1" will enable the one or more clocks of MES 110. This feature is used to shut off or disable an unused MES 110 in a specific kernel for saving power. However, this gating does not affect the interconnection path of the signal register 104 across multiple MES. The scaling offset field 304 is used in all arithmetic instructions for post-scaling the results. The source src2_index/mode offset field 306 is used for scalar addressing of coefficient registers within a MES for vertical MAC instructions (e.g., VRMACB and VRMACBsh). The source src2_index/mode offset field 306 is especially used for vertical multiply and horizontal multiply and add instructions.

Figure 4:
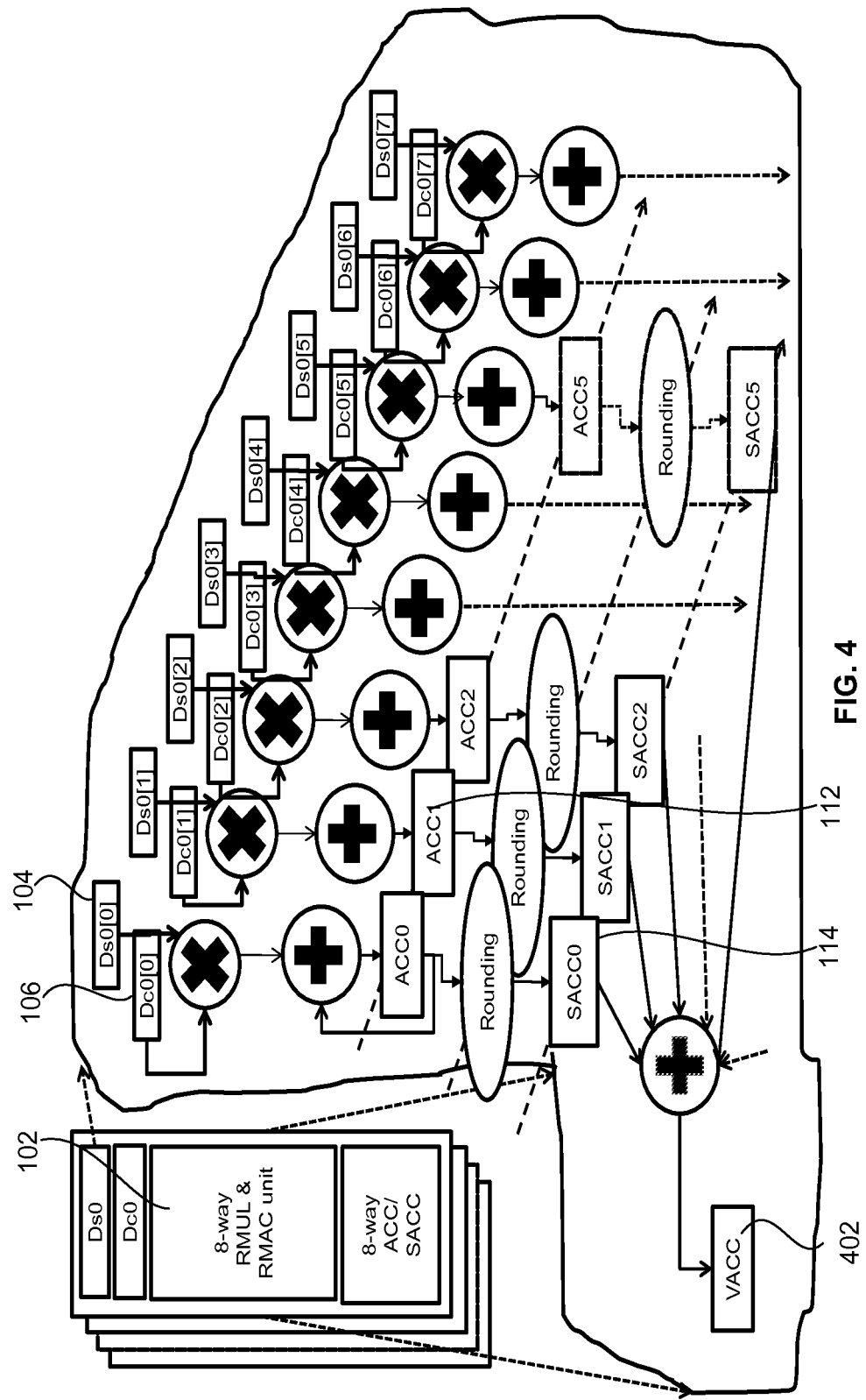
FIG. 4 illustrates a vertical MAC operation for 8-way micro execution slots according to an embodiment herein.

FIG. 4 illustrates a vertical MAC operation for 8-way micro execution slots according to an embodiment herein. This scheme can be extended for any arbitrary number (N-way) of Micro execution slots. The vertical MAC operations for N-way micro execution slots includes the N-way multiply and accumulate (MAC) units 102, the signal registers 104, the coefficient register 106, the scaled accumulators 114, the accumulators 112, and a vector accumulators (VACC) 402. The different possible vertical MAC instructions supported on the vector slot processor 108 having K-Micro Execution Slots (MES) are described as follows. The signal registers (Dsx) 104 and the coefficient registers (Dcx) 106 are implied sources in all these instructions. Assuming a Q.15 format is sufficient for source operands, the functions are described as follows:
In a vertical multiply ([PRED] VRMUL #offset) mode, if (#offset=0): This mode performs 16×16 multiplications slice-wise. Assume, each N slice of 16 bit is computed from the Dsx 104 and the Dcx 106 per MES in accordance with the following relation:

$$ACC[n][31:0] <= \{Dsx[n][15:0]*Dcx[n][15:0]\}.$$

The intermediate result is sign-extended to an extended precision of 40 bits and updated in the accumulator (ACC) 112 pertaining to each slice. A rounding operation is performed on the contents of the accumulators 112 and is updated in the destination SACC 114 or general purpose register in a regfile). SACC[n][15:0]=Round {ACC[n][39:0] for n=0 to N.}. All the N-slices of the SACC 114 and the ACC 112 get updated.

If (#offset=1): then the mode performs 32×16 multiplications slice-wise. In this instruction, the MES is to be divided into N/2 slices. Each of N/2 slices generate an intermediate 48 bits result by multiplying 32 bits obtained by combining 2 slices of the Dsx 104 and 16 bits from the Dcx 106. This is rounded down to 32 bits and then stored into the accumulator 112 of the lower slice (i.e., n=0, 1, 2, 3 . . . N/2 of the corresponding MES). The 16 bits second source is present in the Dcx 106 in the alternate slices 0, 2, 4, and 6. Hence, the result is computed in accordance with the following relation:

$$ACC[n][31:0] <= \text{Round} \{Dsx[n][31:0]*Dcx[n][15:0]\}.$$

In this case, the intermediate result is assumed to be in a Q.47 format and scaled down with rounding to a Q.31 format. A scaled accumulator pair or a 32 bits destination general Purpose Register is updated with the same value as the ACC 112. Hence, SACC [n:n+1][31:0]=ACC[n][31:0]. All the N slices of the SACC 114 and the ACC 112 get updated. Individual SACC's 114 or ACC's 112 get updated in the respective MES's, if the operations are enabled.

The vertical multiply and accumulate function (VRMAC) performs slice-wise multiplication and accumulation for each of the 16 bit slices per MES. Each slice of 16 bit is computed from the Dsx 104 and the Dcx 106 in accordance with the following relation:

$$ACC(new)[n][39:0] <= (Dsx[n][15:0]*Dcx[n][15:0]) + ACC(previous)[n][39:0];$$

$$SACC[n][15:0] <= \text{Round}\{ACC(new)[n][39:0]\}.$$

In the above equation, the ACC 112 is the accumulator per slice of each MES. The contents of the scaled accumulator 114 are subsequently added and the summation value VACC 402 is generated. This is stored back in ACC 112 to be used for further processing.

A Vertical MAC with a broadcasted Coefficient function ([PRED] VRMACB src2_index) is similar to the vertical multiply and accumulate (VRMAC) excepting that the Dcx 106 value used is the same across all the N slices/per MES for all operations and equal to the slice number pointed by the src_index i.e. Dcx [src2_index]. Each slice of 16 bit is computed using Dsx and Dcx [src2_index] as follows:

$$ACC(new)[n][39:0] <= (Dsx[n][15:0]*Dcx[src2\_index]) + ACC(previous)[n][39:0]$$

$$SACC[n][15:0] <= \text{Round}\{ACC(new)[n][39:0\}$$

In the above equation, the ACC 112 is the accumulator per slice and the SACC 114 is the scaled accumulator per slice of each MES. The contents of the scaled accumulator are subsequently added and the summation value VACC 402 is generated. This is stored back in the ACC 112 to be used for further processing.

The Vertical MAC with broadcasted coefficient and sample shift function ([PRED] VRMACB src2_index) instruction performs the same operation as VRMACB and the results are the contents of the ACC 112 and the SACC 114. In addition to the operation in VRMACB, this instruction performs the additional function of replacing the Dsx 104 contents by a sample (i.e. 16 bit) left shifted version of the Dsx (having N-slices). The Dsx 104 register moves uniformly across all the N-MESs based on an interconnect programmed in the CPU control register.

Figure 5:
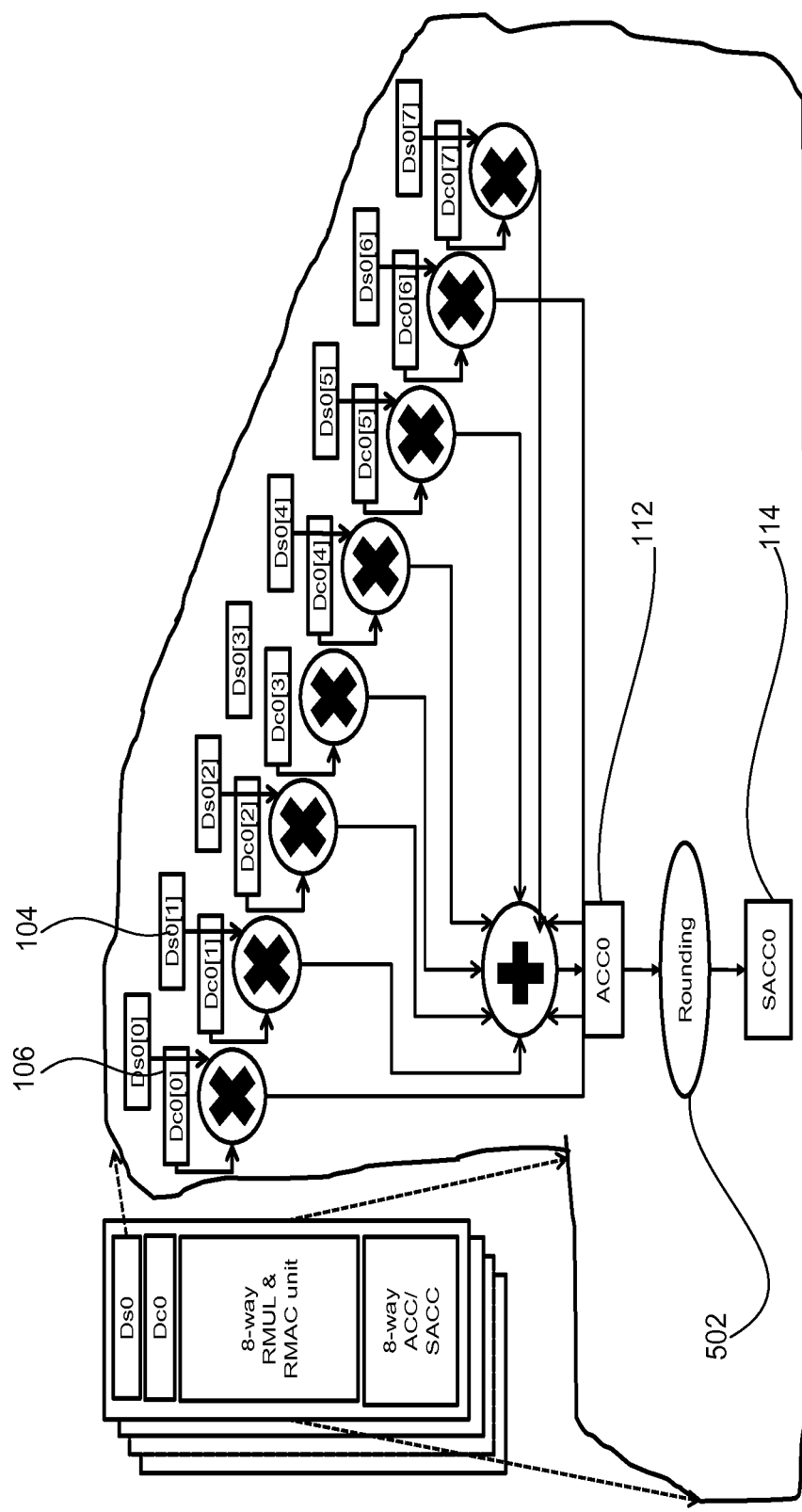
FIG. 5 illustrates horizontal multiply and add operations across 8 MESs according to an embodiment herein.

FIG. 5 illustrates a horizontal multiply and add operations ([PRED] HRMAD #offset) across 8 MESs according to an embodiment herein. This scheme can be extended for any arbitrary number (N-way) of Micro execution slots. The horizontal multiply and add across 8 MESs includes the signal register 104, the coefficient register 106, the accumulator 112, the scaled accumulator 114, and a rounding operation block 502. In the horizontal multiply and add mode, if (#offset=0), then this mode performs slice-wise multiplication per MES and adds the results. Assuming, each of the N slices of 16 bit from the signal register (Dsx) 104 and the coefficient register (Dcx) 106 is used for computation as follows:

$$ACC[N*n][39:0] <= \Sigma\{\text{Sum over all } N \text{ slices}\}(Dsx[n][15:0]*Dcx[n][15:0]).$$

Hence this operation is referred as horizontal accumulation. The scaled accumulator 114 contains the 16 bits results per slice as per the following relation:

$$SACC[N*n][15:0] <= \text{Round}\{ACC[N*n][39:0]\}.$$

The accumulator 112 and scaled accumulator 114 registers mentioned above are on a per slice basis (for each MES).}
If (#offset=1): this mode performs slice-wise 32×16 multiplications, rounds the intermediate result back to 32 bits and then adds them. In this instruction, the MES is to be divided into N/2 slices. Each of N/2 slices generate an intermediate 48 bit result by multiplying 32 bits obtained by combining 2 slices of the Dsx 104 and 16 bits from the Dcx 106. This is rounded down to 32 bits using the rounding operation block 502 and then stored into the accumulator (ACC) 112 of a lower slice. Hence the result is computed in accordance with the following relation:

$$ACC[n][31:0] <= \text{Round}\{Dsx[n][31:0]*Dcx[n][15:0]\}.$$

In this case, the intermediate result is assumed to be in a Q.47 format and scaled down with rounding 502 to a Q.31 format. The scaled accumulator (SACC) 114 is updated with the same value as the ACC 112. Hence, SACC [n:n+1][31:0]=Σ{Sum over all N/2 slices}ACC[n][31:0]. All the N/2-SACC pairs and the ACC 112 get updated. Individual SACC's 114 or ACC's 112 get updated in the respective MES's if the operations are enabled using the predication field.

The horizontal multiply and add with shift ([PRED] HRMAD #offset) is similar to the HRMAD instruction and the results are the contents of the ACC 112 and the SACC 114. In addition to the above, these instructions perform the additional function of replacing the Dsx 104 contents by a one sample (16 bits) shifted version, or a two sample shifted or a four sample shifted version of the Dsx 104 (having N-samples). The Dsx 104 moves uniformly across all the N-MESs based on the programmed interconnect in the CPU control register. The vector shift instruction ([PRED] VSHL #offset1) is used to shift the contents of the Dsx 104 (Signal registers) by one sample (16 bits), two samples (32 bits) or four samples (64 bits). The two bits #offset field specifies the shift accordingly:

offset1=2'b00=>Shift by 16 bits, offset1=2'b01,=>Shift by 32 bits, offset1=2'b10=>Shift by 64 bits.

The result of instructions (i) VRMUL, (ii) VRMAC, (iii) VRMACB, (iv) VRMACBsh, (v) HRMAD, (vi) HRMADsh, (vii) HRMADsh2 and (viii) HRMADsh4 is a 40 bit value and stored in an extended precision accumulator (ACC) 112. Scaled accumulators (SACC) 114 receives the 40 bit value from the accumulators (ACC) 112 and perform a scale-down operation and a rounding operation based on an immediate scaling offset using simple arithmetic rounding or convergent rounding to 16-bits. The below example shows what is extracted from the extended precision accumulator (ACC) 112 for different values of scaling offset field for some representative values. The possible value of the 5-bit scaling offset field is from 0 to 24.

Assume that the accumulator result before doing this scale down operation is operation is represented as {s.g7_g6_g5_g4_g3_g2_g1_g0_f0_f1_f2_f3_ . . . _f30}
scaling offset field=0; Rx={s.[g7_g6_g5_g4_g3_g2_g1_g0_f0_f1_f2_f3_f4_f5_f6]};
scaling offset field=1; Rx={s.[g6_g5_g4_g3_g2_g1_g0_f0_f1_f2_f3_f4_f5_f6_f7]};
scaling offset field=2; Rx={s.[g5_g4_g3_g2_g1_g0_f0_f1_f2_f3_f4_f5_f6_f7_f8]};
. . . similarly values can be derived for other offset values also.
scaling offset field=7; Rx={s.[g0_f0_f1_f2_f3_f4_f5_f6_f7_f8_f9_f10_f11_f12_f13]};
scaling offset field=8; Rx={s.[f0_f1_f2_f3_f4_f5_f6_f7_f8_f9_f10_f11_f12_f13_f14_f15]};
scaling offset field=9; Rx={s.[f1_f2_f3_f4_f5_f6_f7_f8_f9_f10_f11_f12_f13_f14_f15]};
scaling offset field=24; Rx={s.[f16_f17_f18_f19_f20_f21_f22_f23_f24_f25_f26_f27_f28_f29_f30]};
The notation [ ] means that the 16 bit-value finally stored in destination SACC 114 is rounded depending the contents of discarded Least Significant Bits (LSB's) from the extended precision accumulator (ACC) 112 and depending on whether convergent or arithmetic rounding is performed. The final result should be saturated if there is an overflow in the higher significant bits.

Figure 6:
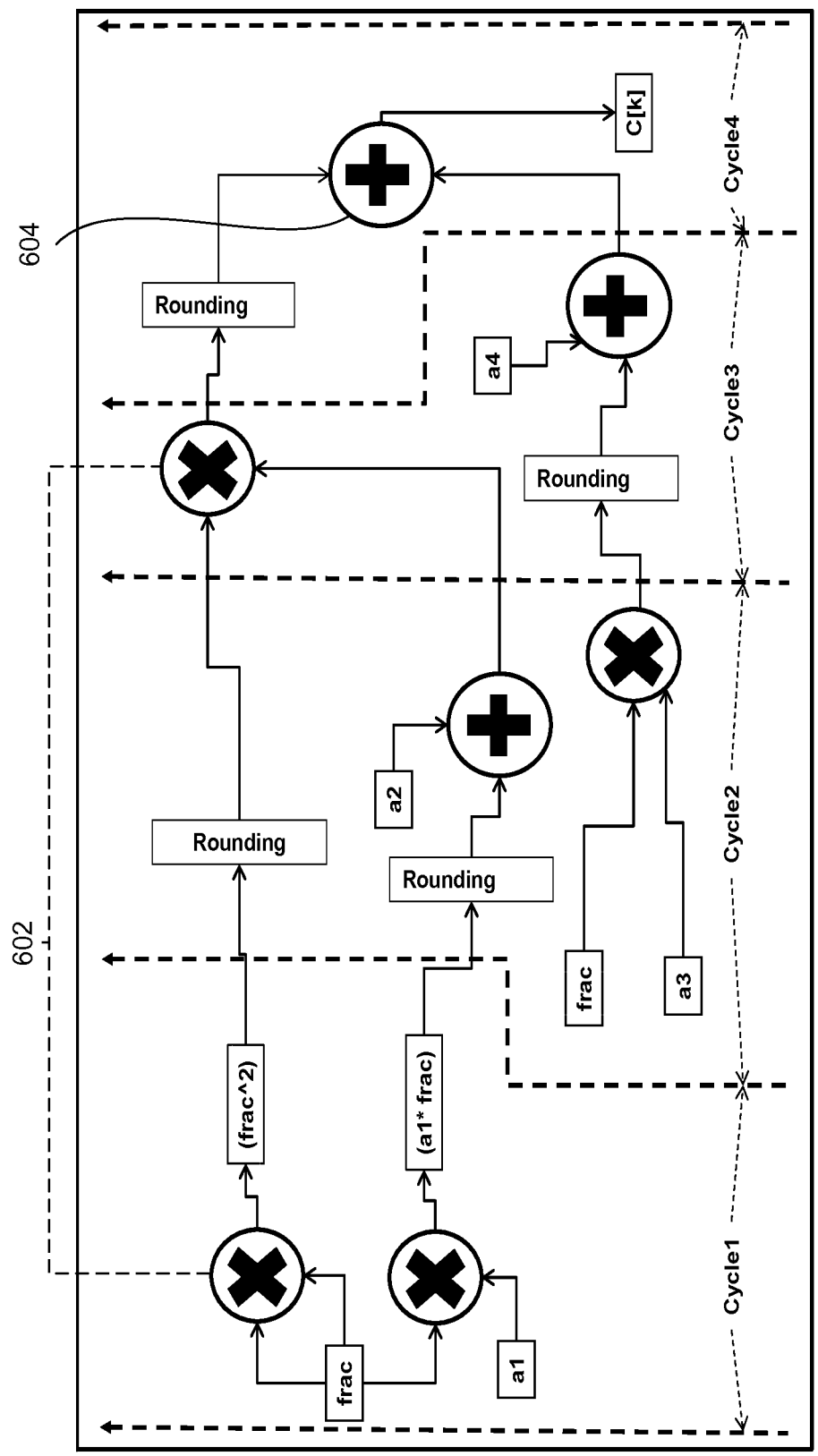
FIG. 6 is a block diagram illustrating generation of polynomial interpolation coefficients using the MES of FIG. 1 according to an embodiment herein.

FIG. 6 is a block diagram illustrating generation of polynomial interpolation coefficients using the MES 110 of FIG. 1 according to an embodiment herein. MES 110 includes one or more multipliers 602, and one or more adders 604 which are reused in different cycles to perform the function. The cubic polynomial basis equation instruction ([PRED] Poly-CoeffGen #offset(2 bit), Dcx) is used to generate one or more coefficients (e.g., four coefficients) corresponding to cubic polynomial basis equations which are required for waveform interpolation. The input argument "frac" is present in the lower 16 bits of an Rsrc register and is indicated using the #offset (2 bits). The equations corresponding to the different basis equations are as follows, $$C0=(a4+a3*\text{frac}+a2*\text{frac}^2+a1*\text{frac}^3) \quad (1)$$

$$C1=(b4+b3*\text{frac}+b2*\text{frac}^2+b1*\text{frac}^3) \quad (2)$$

$$C2=(c4+c3*\text{frac}+c2*\text{frac}^2+c1*\text{frac}^3) \quad (3)$$

$$C3=(d4+d3*\text{frac}+d2*\text{frac}^2+d1*\text{frac}^3) \quad (4)$$

The Coefficients a4, a3, a2, a1, b4, b3, b2, b1, c4, c3, c2, c1, d4, d3, d2, d1 are stored as Q.15 formatted numbers in the CPU Control Registers. The outputs generated are stored in the destination register as follows in the Dcx.

C0=Dcx[0]; C1=Dcx[1]; C2=Dcx[2]; C3=Dcx[3].

The remaining Dcx are cleared to zeros. This above instruction completes in four cycles. These operations are non-pipelined. The destination of this instruction is Dcx which is the coefficient register. Basic equations of the cubic polynomials used for Interpolation are as follows:

$$P1 = a1*x[0] + b1*x[1] + c1*x[2] + d1*x[3] \quad (1)$$

$$P2 = a2*x[0] + b2*x[1] + c2*x[2] + d2*x[3] \quad (2)$$

$$P3 = a3*x[0] + b3*x[1] + c3*x[2] + d3*x[3] \quad (3)$$

$$P4 = a4*x[0] + b4*x[1] + c4*x[2] + d4*x[3] \quad (4)$$

$$Y[n] = P4 + \text{frac}*(P3 + \text{frac}*(P2 + \text{frac}*P1)); \quad (5)$$

Substituting P1, P2, P3 and P4 in the above equation (5), the resultant equations are as follows:

$$Y[n] = (a4 + a3*\text{frac} + a2*\text{frac}^2 + a1*\text{frac}^3)*x[0] + (b4 + b3*\text{frac} + b2*\text{frac}^2 + b1*\text{frac}^3)*x[1] + (c4 + c3*\text{frac} + c2*\text{frac}^2 + c1*\text{frac}^3)*x[2] + (d4 + d3*\text{frac} + d2*\text{frac}^2 + d1*\text{frac}^3)*x[3].$$

Hence, the required coefficients are of the form:

$$C[0] = (a4 + a3*\text{frac} + a2*\text{frac}^2 + a1*\text{frac}^3)$$

$$C[1] = (b4 + b3*\text{frac} + b2*\text{frac}^2 + b1*\text{frac}^3)$$

$$C[2] = (c4 + c3*\text{frac} + c2*\text{frac}^2 + c1*\text{frac}^3)$$

$$C[3] = (d4 + d3*\text{frac} + d2*\text{frac}^2 + d1*\text{frac}^3)$$

The generation of polynomial interpolation coefficients in the MES 110 makes use of two multipliers 602 and one adder 604 to complete the operation in four cycles. In one embodiment, the operation is non-pipelined as there is no need to generate coefficients at a constant rate most of the times. However, a pipelined operation can be easily crafted using similar techniques. In addition to the above, the vector slot processor 108 implements vector addition, vector subtraction, vector minus scalar and vector plus scalar operations. The vector slot processor 108 also allows purely scalar operations such as scalar addition, scalar subtraction, extraction, left shift and sign extended right shift.

FIG. 7 illustrates a layout 700 of the CPU control registers according to a first embodiment herein. The layout of the CPU control registers is used for programmable switch interconnection control for shifting the samples of the signal register 104. In this example, eight MESs 110 are shown. There are eight switches for each of the eight MESs 110 and three additional switches for the additional buffer registers.

FIG. 8 illustrates a layout 800 of CPU control registers according to a second embodiment herein. The layout 800 of the CPU control registers is used for programming the polynomial coefficients (a4, a3, a2, a1, b4, b3, b2, b1, c4, c3, c2, c1, d4, d3, d2, d1), which are stored as Q. 15 formatted numbers. This is done by using eight CPU control registers.

A pseudo code of FIR filtering for a first method according to an embodiment herein, is shown below

```
for (n=0, n < K, n+=kdelta)
    for (k=0; k < N; k+=N_delta) {
output [n] += coef[k] * input [n+k] + coef[k+1] * input [n+k+1] +
    coef[k+2]*input[n+k+2] + ....
output [n+1] += coef[k] * input [n+k+1] + coef[k+1] * input [n+k+2] +
    coef[k+2]*input[n+k+3] + ....
output [n+2] += coef[k] * input [n+k+2] + coef[k+1] * input [n+k+3] +
    coef[k+2]*input[n+k+4] + ....
.......
.......
.........
output [n+kdelta-1] += coef[k] * input [n+k+kdelta-1] + coef[k+1] *
``` input [n+k+kdelta]
+ coef[k+2]*input[n+k+kdelta+1] + ....
}

The above first method is used if the number of tap coefficients are less than or equal to K×N (i.e., product of number of micro-execution slots and number of MACs per micro execution slot). All the different coefficients are loaded completely into the Dcx (Coefficient Register) of N-MAC units per MES. Once the coefficients are loaded they need not be reloaded for different cycles. Now, the signal register 104 are loaded initially to start with and subsequently shifted concurrently with the completion of each horizontal multiply and add operation (HRMAD instruction). The outputs of the horizontal multiply and additions are summed up to generate a single filter output per cycle. This operation is performed in a software pipelined loop to obtain a block of data which is subsequently stored into a memory.

A pseudo code of FIR filtering for a second method according to an embodiment herein, is shown below.

```
for (n=0, n < K, n+=kdelta)
    for (k=0; k < N; k++) {
output [n] += coef[k] * input [n+k] ;
output [n+1] += coef[k] * input [n+k+1] ;
output [n+2] += coef[k] * input [n+k+2] ;
....
....
.....
output [n+kdelta-1] += coef[k] * input [n+k+kdelta-1] ;
}
```

The above second method performs a parallel computation of N×K filter outputs rather than computing a single sample filter output per cycle. For each cycle, it pushes in the same value of coefficient in all the Dcx across all the N×K MAC units. In each cycle the new sample values are shifted in with a concurrent operation of a vertical multiply and accumulate operation. The vertically accumulated value is scaled within the MESs 110 to obtain a scaled down value as per the required output precision. Hence at every cycle, it generates N×K filter outputs. Across different cycles, a new value of coefficient is made available to all the Dcx, and fresh values of N×K outputs are generated.

Figure 9:
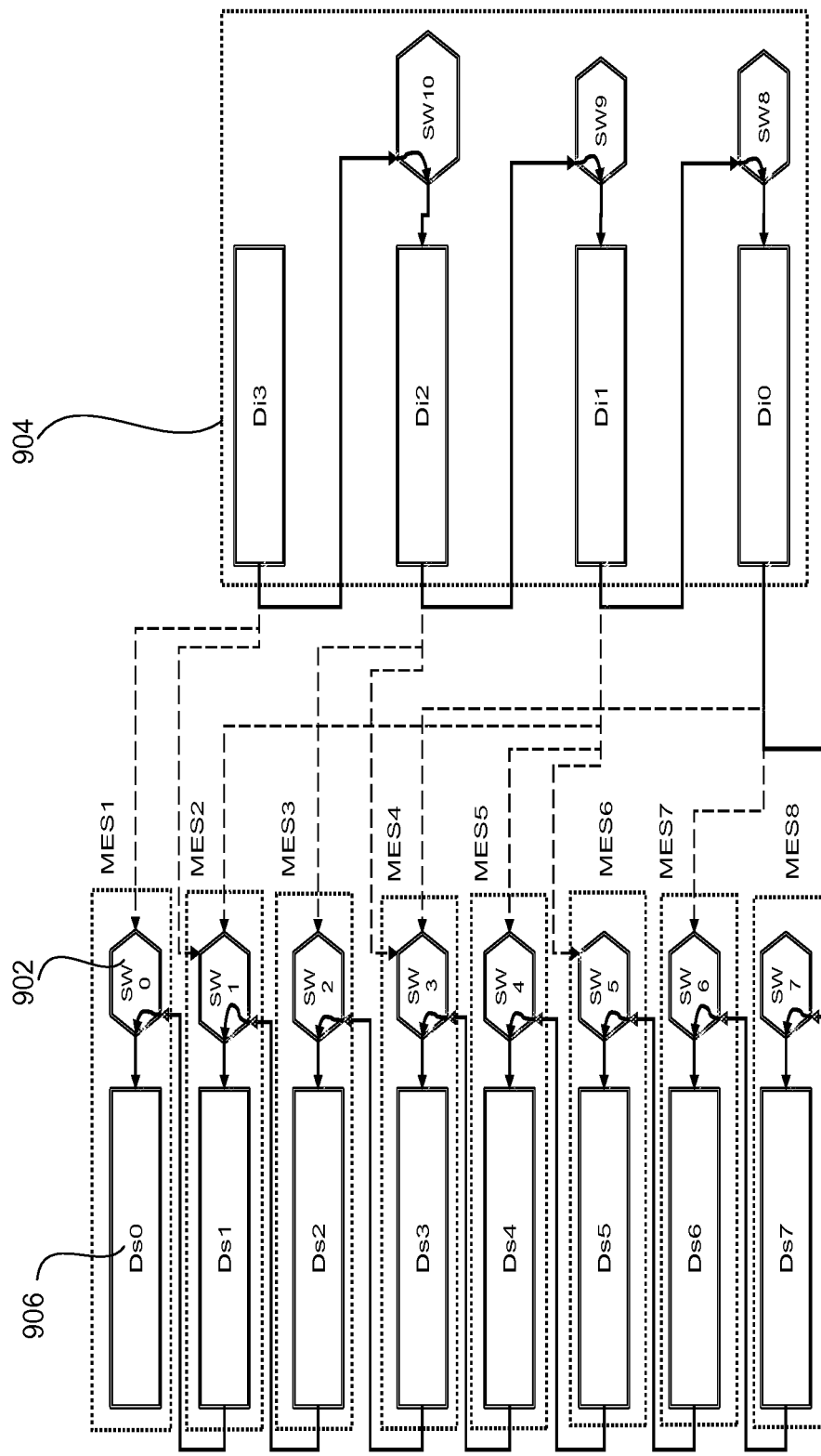
FIG. 9 illustrates a connectivity of signal and buffer registers via programmable switches for FIR filtering according to an embodiment herein.

FIG. 9 illustrates a connectivity of the signal register 906 and buffer register 904 via the programmable switches 902 for FIR filtering according to an embodiment herein. The connectivity of signal and buffer registers via programmable switches 902 for FIR filtering includes the micro execution slot 110 which includes the buffer register 904, the signal register 906, and one or more programmable switches 902. The signal registers 906 and the buffer register 904 are connected via the switches 902 for FIR filtering when there are 8 MESs 110 and four buffer registers 904.

The up-sampling of the input data vector may be performed by a factor of K, where K is the number of micro execution slots 110 in the vector slot processor. Filter coefficients are stored in 'Dcx' of the N-way micro execution slot 110. 'Dix' (buffer registers) 904 are configured in such a way that the 0 to (Nb−1) input samples are broadcasted to K 'Dsx' registers (i.e., K×N Dsx registers), where Nb is less than equal to N. Each MES 110 generates a horizontal accumulated sum which is scaled down and used. Here all K-MES's 110 are used for a filtering operation and the same numbers of outputs are collected from K-MES's accumulator. In this manner, a K-way up-sampling filter with N-taps each is generated. Similarly, up-sampling of the input data vector may be performed by a factor of K/2.

Two 'Dix' registers (buffer registers) 904 are configured in such a way that the 0 to ((Nb/2)−1) input samples broadcasted to K/2 'Ds' registers (i.e. (K/2)×N Dsx) of the first K/2 MESs 110). Similarly (Nb/2) to (Nb−1) input samples are broadcasted to the remaining K/2 'Dsx' registers of the remaining K/2 MESs 110. Each MES 110 generates a horizontal accumulated sum which is scaled down and used. The filter has 2 groups of K/2 outputs which are available simultaneously every cycle. In this manner, a K/2-way up-sampling filter with N-taps each is generated.

Figure 10:
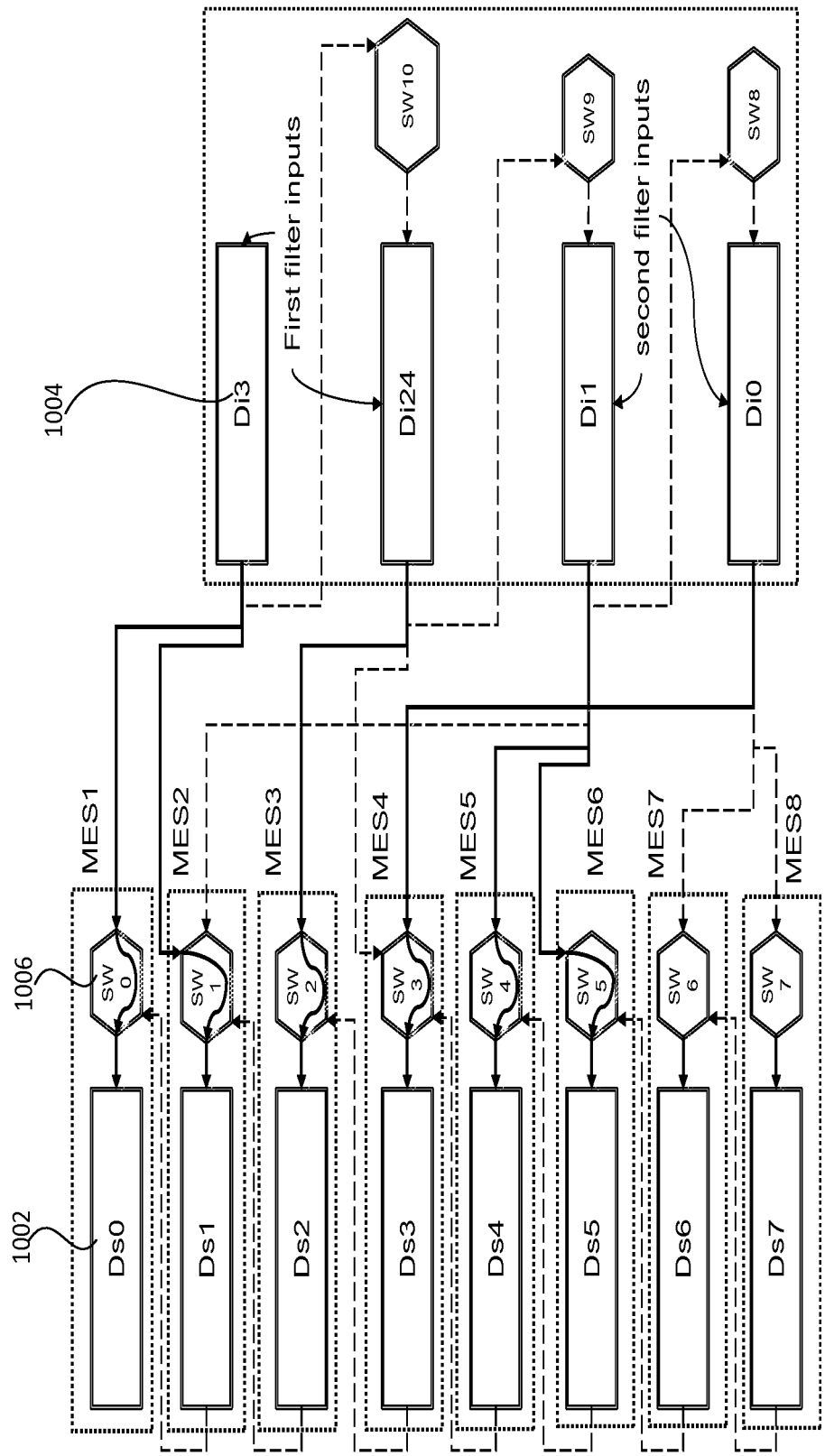
FIG. 10 illustrates a programmable switch connectivity for two 3× interpolation filters according to an embodiment herein.

FIG. 10 illustrates programmable switch connectivity for two 3× interpolation filters according to an embodiment herein. The programmable switch connectivity for two 3× interpolation filters includes signal registers 1002 (Ds0, Ds1, Ds2, Ds3, Ds4, Ds5, Ds6, Ds7), buffer registers 1004 (Di0, Di1, Di2, Di3), switches 1006, and micro execution slots 110. The signal registers 1002 and the buffer registers 1004 are connected via the switches 1006 for implementing two simultaneous 3× interpolation filters when there are 8 MESs 110 and 4 buffer registers 1004. In this case, the Di2 and Di3 are loaded with input samples of a first filter and Di0 and Di1 are loaded with input samples for a second filter.

A first set from the Di2, Di3 is shifted into the Ds0, Ds1, Ds2 and a second set from the Di0, Di1 is shifted into the Ds3, Ds4, Ds5 while nothing is shifted into Ds6 and Ds7. During filtering, only the first three MESs 110 have corresponding Dcx loaded with the coefficients for a first 3× interpolation, while the next three MESs 110 have corresponding Dcx loaded with coefficients for a second 3× interpolation filter. Thus, the first three MESs 110 generate the outputs for the first 3× interpolation filter while the next three MESs 110 generate the outputs for the next 3× interpolation filter. During this operation, the last two MESs (MES7 and MESS) 110 are disabled using the predicated fields in the instruction field.

Figure 11:
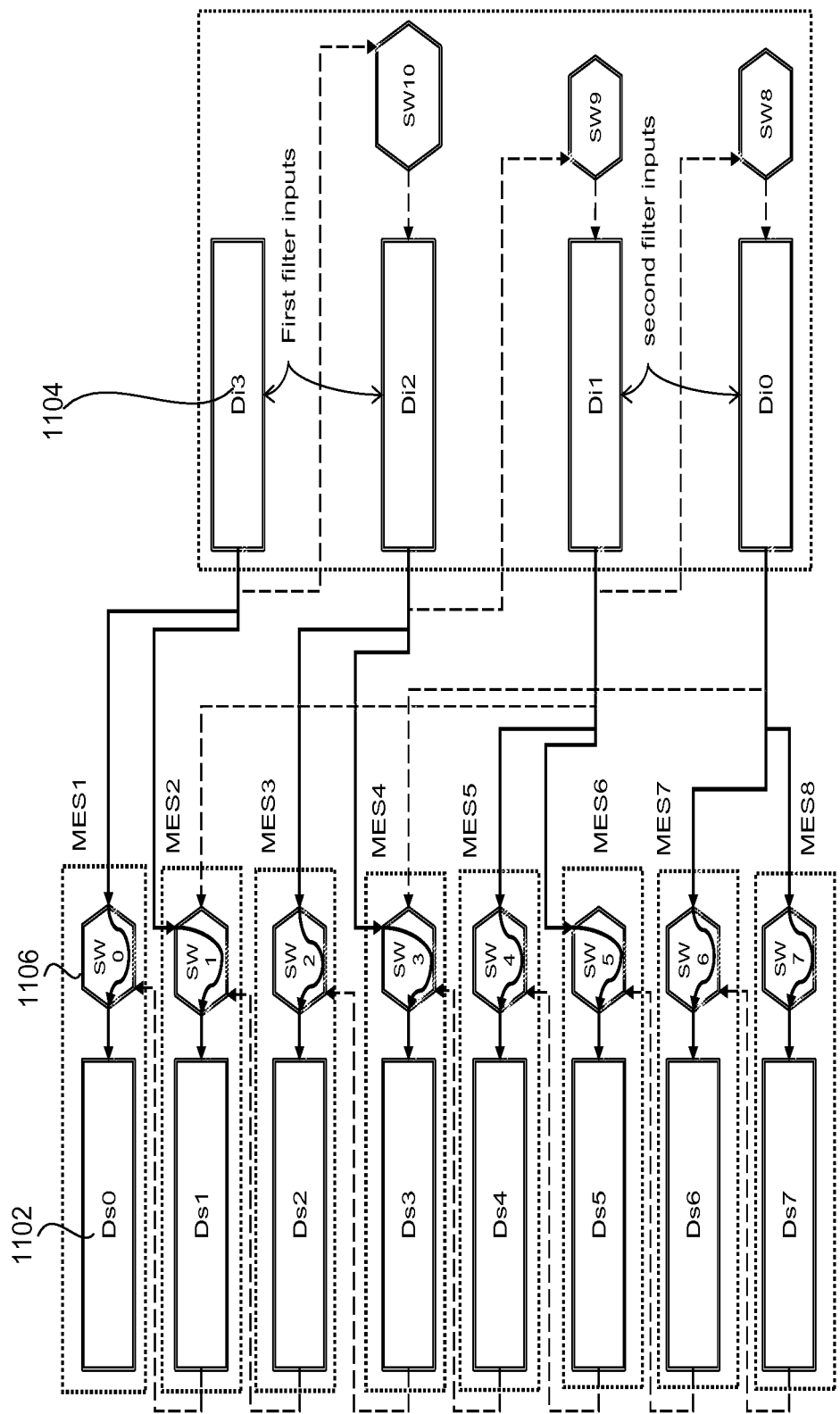
FIG. 11 illustrates a programmable switch connectivity for two 4× interpolation filters according to an embodiment herein.

FIG. 11 illustrates the programmable switch connectivity for two 4× interpolation filters according to an embodiment herein. The programmable switch connectivity for two 4× interpolation filters includes the signal registers 1102, the buffer registers 1104, the switches 1106, and micro execution slots 110. The signal registers 1102 (Ds0, Ds1, Ds2, Ds3, Ds4, Ds5, Ds6, Ds7) and the buffer registers 1104 are connected via the switches 1106 for implementing one 4× interpolation filter when there are eight MESs 110 and four buffer registers 1104 (Di0, Di1, Di2, Di3). In this case, the Di2, Di3 are loaded with input samples of the first filter and Di0, Di1 are loaded with input samples for the second filter. The first set is shifted into the Ds0, Ds1, Ds2, Ds3 and second set is shifted into Ds4, Ds5, Ds6, and Ds7. During filtering only the first four MESs have corresponding Dcx loaded with the coefficients for a first 4× interpolation, while the next four MESs have corresponding Dcx registers loaded with coefficients for a second 4× interpolation filter. Thus the first 4 MESs generate the outputs for the first 4×interpolation filter while the next four MESs generate the outputs for the next 4× interpolation filter.

Figure 12:
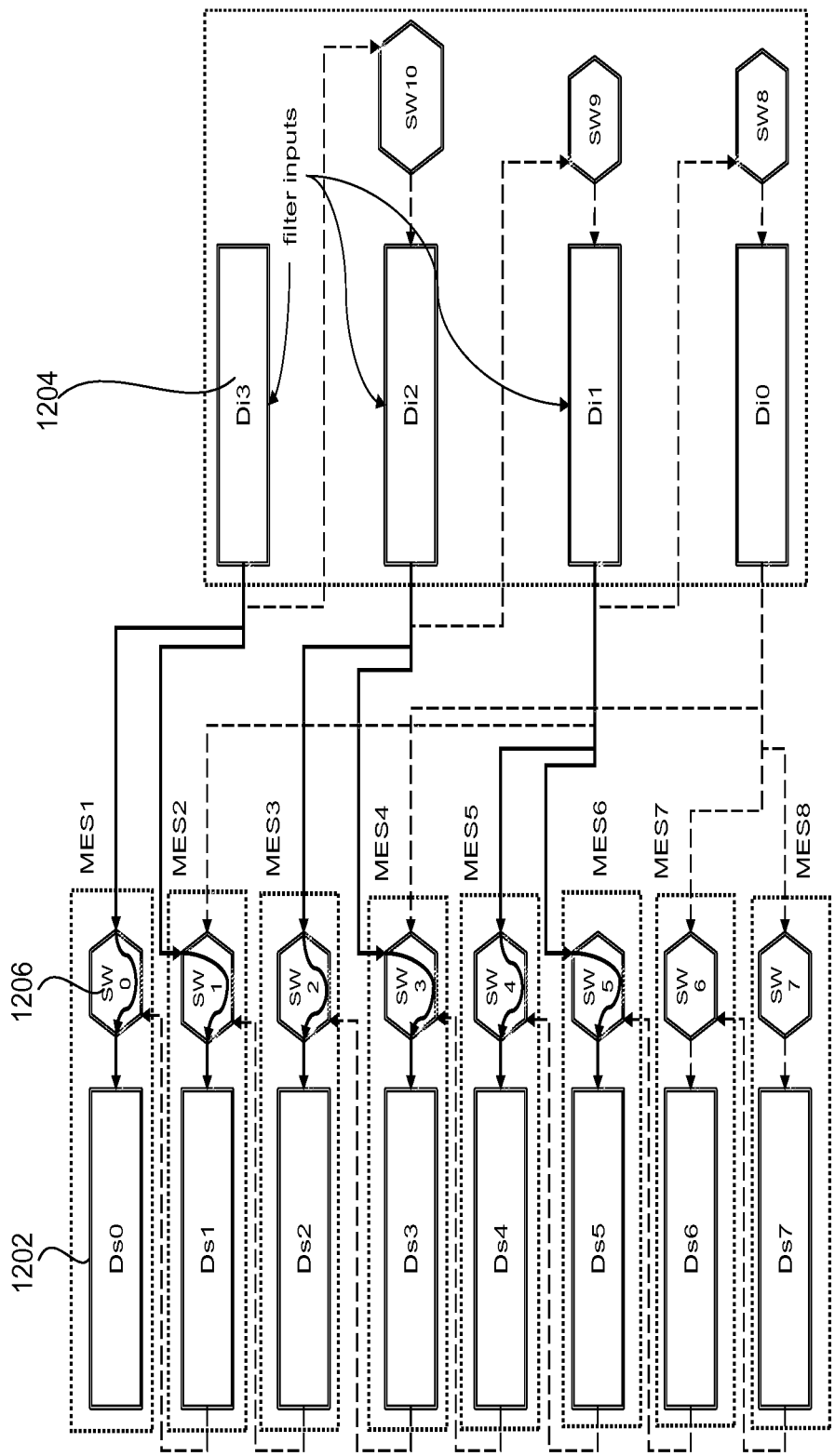
FIG. 12 illustrates a programmable switch interconnection for one 6× Interpolation filter according to an embodiment herein.

FIG. 12 illustrates a programmable switch interconnection for one 6× Interpolation filter according to an embodiment herein. It includes the signal registers 1202 (Ds0, Ds1, Ds2, Ds3, Ds4, Ds5, Ds6, Ds7), the buffer registers 1204 (Di0, Di1, Di2, Di3), the switches 1206, and the micro execution slots 110. The signal registers 1402 and the buffer registers 1204 are connected via the switches 1206 for implementing one 6×interpolation filter when there are 8 MESs 110 and 4 buffer registers 1204. In this case, the Di1, Di2, Di3 are loaded with input samples of the filter. These input samples are shifted into the Ds0, Ds1, Ds2, Ds3, Ds4, Ds5 while nothing is shifted into Ds6 and Ds7. During filtering, only the first 6 MESs 110 have corresponding Dcx loaded with the coefficients for 6×interpolation. Thus the first 6 MESs 110 generate the outputs for the 6×interpolation filter. During this operation the last two MESs (MES7 and MESS) 110 are disabled using the predicated fields in the instruction field.

Figure 13:
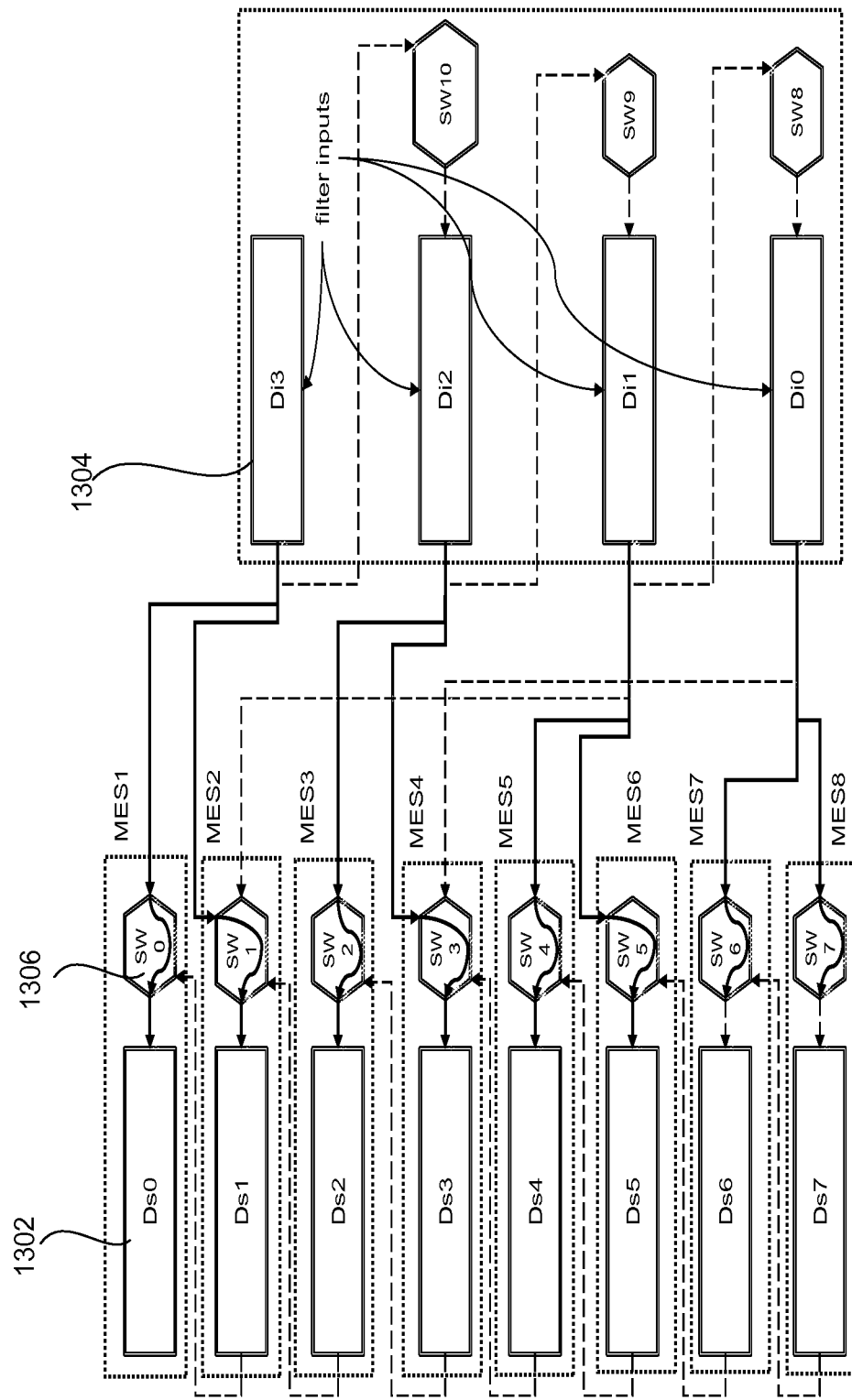
FIG. 13 illustrates a programmable switch interconnection for one 8× interpolation filter according to an embodiment herein.

FIG. 13 illustrates a programmable switch interconnection for one 8× interpolation filter according to an embodiment herein. The programmable switch interconnection for one 8×interpolation filter includes the signal registers 1302 (Ds0, Ds1, Ds2, Ds3, Ds4, Ds5, Ds6, Ds7), the buffer registers 1304 (Di0, Di1, Di2, Di3), the switches 1306, and the micro execution slots 110. The down-sampling operation (e.g., down-sampling by 2, 4, and 8 times the sampling frequency with K×N taps) can be performed in the vector slot processor 108. This method is used when the number of tap coefficients are less than or equal to K×N (i.e. product of number of micro-execution slots 110 and number of MACs per micro-execution slots). All the different coefficients can be loaded completely into the Dcx (Coefficient Register) of K×N MAC units. Once the coefficients are loaded, they need not be removed for different cycles. Now, the signal registers 1302 are loaded initially to start with and subsequently shifted concurrently with the completion of each horizontal multiply and add operation (HRMAD instruction).

In down-sampling by two, the input sample that is pushed into buffer registers 1304 is shifted by two in conjunction with the signal registers 1302 in the different MESs 110. Similarly, in down-sampling by four, the input sample that is pushed into buffer registers 1304 is shifted by four in conjunction with the signal registers 1302. The outputs of the horizontal multiply and additions are summed up to generate a single filter output per cycle. In one embodiment, this operation is performed in a software pipelined loop to get a block of data which is subsequently stored into memory. The configuration of programmable switches during a down-sampling operation may be similar to the configuration of programmable switches used for FIR filtering as shown in pseudo code earlier.

Figure 14:
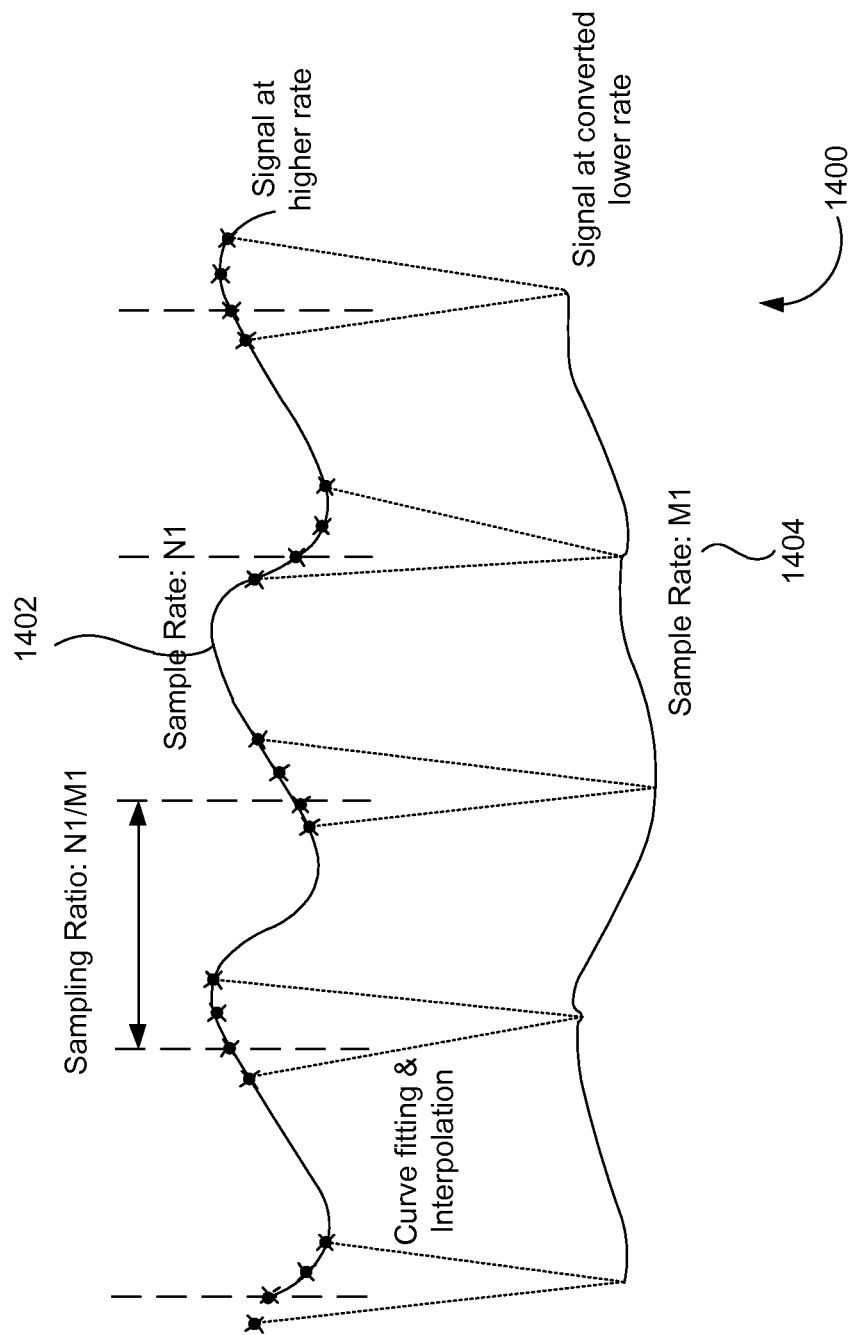
FIG. 14 illustrates a graphical representation of a waveform interpolation according to an embodiment herein.

FIG. 14 illustrates a graphical representation 1400 of a waveform interpolation according to an embodiment herein. The waveform interpolation includes a waveform at an input sample rate N1 1402 that has to be converted to a desired sample rate M1 1404 waveform. The conversion of samples from higher sample rates to lower sample rates may be performed using an interpolation of intermediate points where the sampling ratio is not an integer. The first waveform sampled at a rate N1 is used as an input and converted to a new waveform of sample rate M1, M1 being less than N1. In such cases, the input waveform at a sample rate N1 is (M1<=N1/4) and then a chosen band of points is used to interpolate and derive the new waveform.

Figure 15:
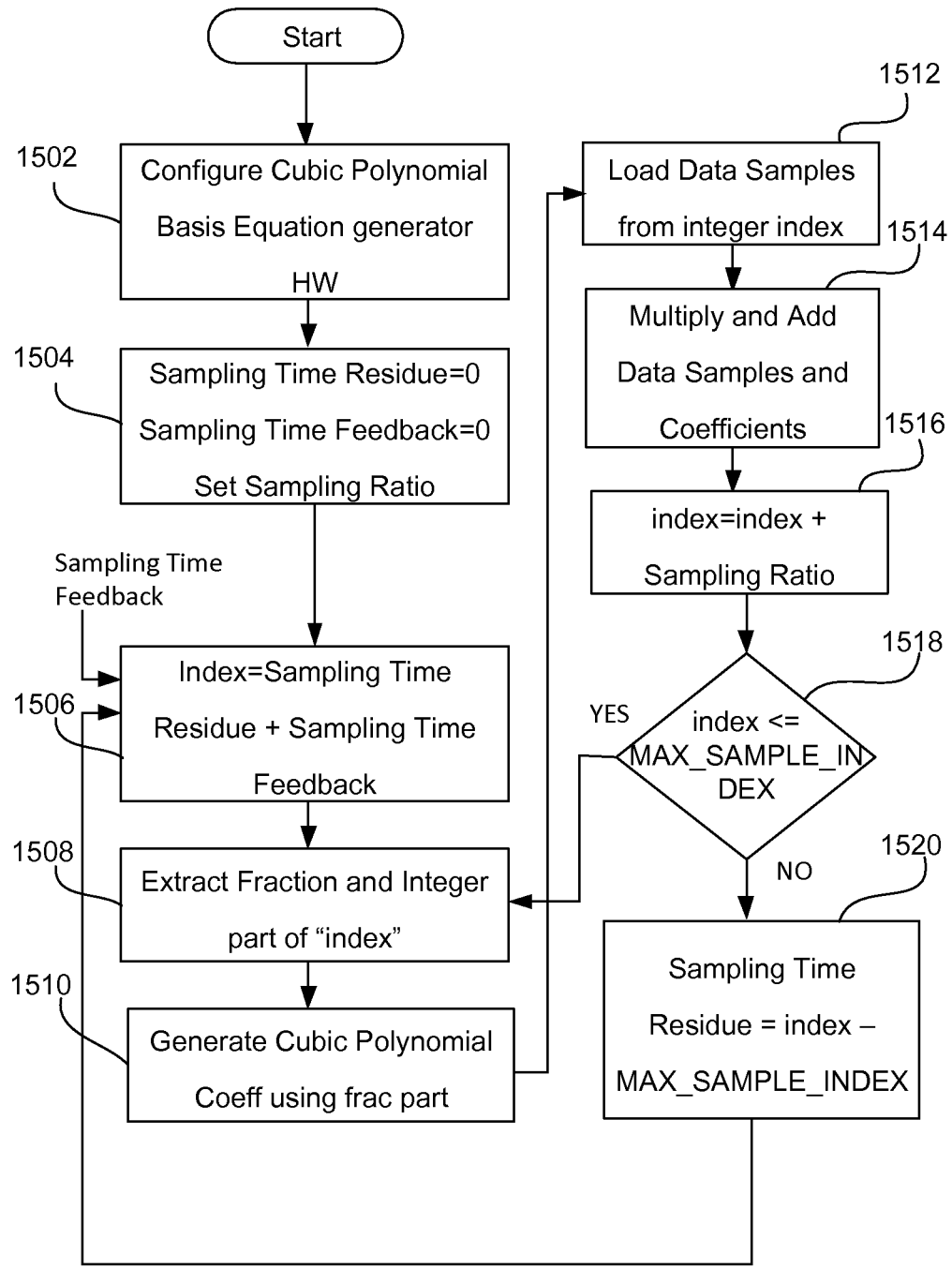
FIG. 15 is a flow diagram illustrating waveform interpolation using a cubic polynomial coefficient generator according to an embodiment herein.

FIG. 15 is a flow diagram illustrating waveform interpolation using a cubic polynomial coefficient generator according to an embodiment herein. In step 1502, the cubic polynomial interpolator is configured at the start by programming the parameters in polynomial interpolation registers 1 to 8 (i.e. a1, a2, a3, a4, b1, b2, b3, b4, c1, c2, c3, c4, d1, d2, d3, d4). In step 1504, the parameters sampling time residue and sampling time feedback are initialized to zero. In step 1506, the sampling ratio is determined by computing N1/M1 for the first point of this interpolation since the index is initialized to zero. In step 1508, the first value of fractional part named "frac" is determined by using the fractional part of the sampling ratio as the starting value. In step 1510, the coefficients C0, C1, C2 and C3 are calculated based on the fractional part.

In step 1512, the data samples are loaded from the corresponding integer part of the sampling ratio. In step 1514, the data samples and coefficients are individually multiplied and accumulated to generate an interpolated value. In step 1516, the index is subsequently incremented by the sampling ratio. In step 1518, it is checked whether an integer part of calculated index is less than or equal to the maximum sample index possible for that given block of input data. If the check in step 1518 is true, the fractional part is extracted again, the cubic polynomial coefficients and the value of the interpolated point are regenerated. If at some point the calculated index is greater than the maximum sample index and the check in step 1518 is false, then the step 1520 is executed.

In step 1520, a sampling time residue is calculated by subtracting the maximum sample index (MAX_SAMPLE_INDEX) from the current index. This residue is added to the sampling timing feedback obtained from the downstream signal processing blocks and the index is recalculated in accordance with the equation in step 1506:

Index=sampling time reside+sampling time feedback.

The entire process is repeated (steps 1506 till 1520) with recalculation of the fractional part of the index for obtaining new interpolated points.

Figure 16:
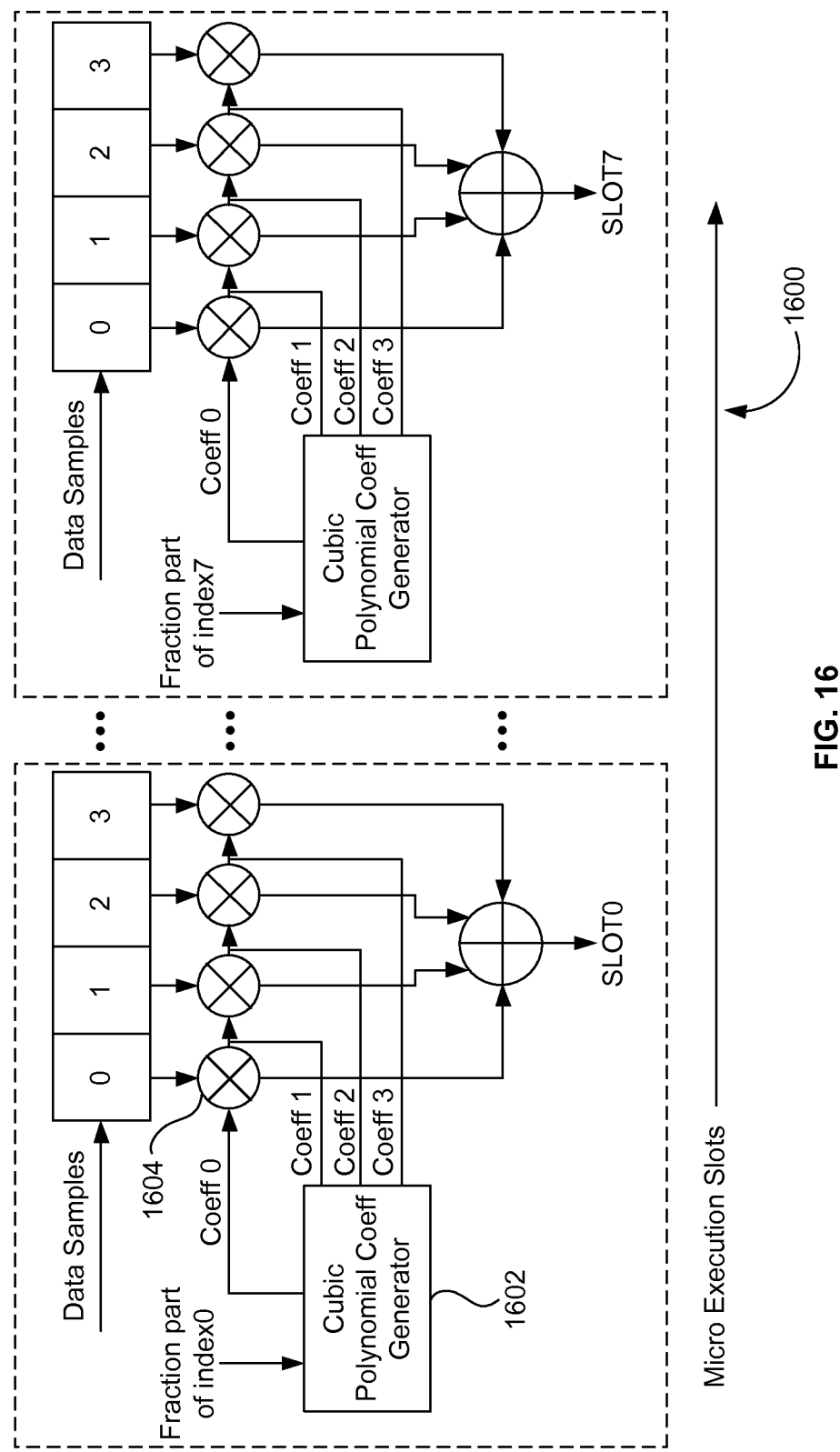
FIG. 16 illustrates an allocation of waveform interpolation on micro execution slots in the vector slot processor according to an embodiment herein.

FIG. 16 illustrates an allocation of waveform interpolation on micro execution slots (MES) 110 in the vector slot processor 108 according to an embodiment herein. The allocation of waveform interpolation includes a cubic polynomial coefficient generator 1602, and one or more multipliers 1604. In the vector slot processor 108, all the cubic coefficients may be calculated in one MES if it has a minimum of two multipliers and an adder as shown in FIG. 6 and it subsequently calculates one interpolation point. The interpolation points are calculated using a minimum of four multipliers 1604.

Hence, using the vector slot processor 108, interpolation points are calculated depending on the number of scalable micro-execution slots present. In one embodiment, the vector slot processor 108 is used in any length of FIR and IIR filtering using multiply and accumulate, and multiply and add operations, and also used for any factor up-sampling and down-sampling filter using basic up-sample/down-sample kernels of by two and four. Additionally the programmable cubic polynomial support enables arbitrary sample rate conversion or waveform interpolation.

A pseudo code of cross correlation according to an embodiment herein, is shown below:

```
x( ) & y( ) are two signals with length len_x and len_y respectively
For(i=0;i<(len_x - len_y);i++) {
Corr_coeff[i] = 0;
For(j=0;j<len_y;j++) {
   Corr_coeff[i] += x(i+j)*y(j)
}}
```

Corr_coeff [i]: cross correlation coefficient of the signals at delay iN×K (i.e., product of number of micro-execution slots and number of MACs per micro execution slot) number of Dsx are loaded with x( ) signal samples and N×K number of Dcx registers are loaded with y( ) signal samples and a vertical MAC (VRMAC) operation is performed on loaded signal samples. The VRMAC operation is continued until all x( ) samples are processed.

A pseudo code of auto correlation according to an embodiment herein, is shown below:

```
Corr_coeff[i] = 0;
Auto_corr_coeff = 0;
For(i=0;i<(len_x - len_y);i++)
{
   auto_corr_coeff += x(i)*x(i+delay)
}
```

N×K (i.e., product of number of micro-execution slots and number of MACs per micro execution slot) Dsx are loaded with x( ) signal samples and N×K Dcx are loaded with a delayed signal of x( ) samples and a vertical MAC (VRMAC) operation is performed. The VRMAC operation is continued until all x( ) samples are processed.

Figure 17:
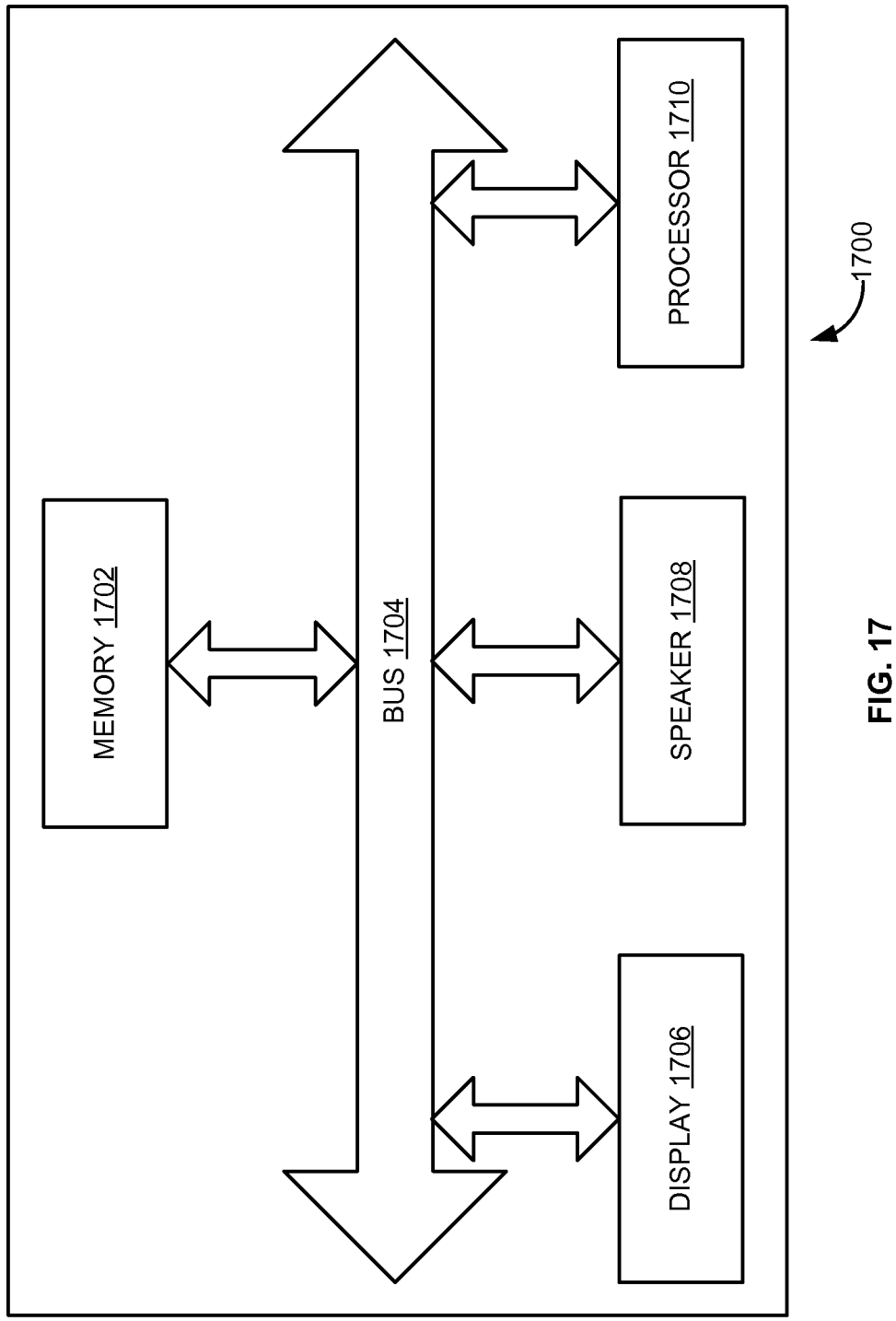
FIG. 17 illustrates an exploded view of a receiver having an a memory having a set of computer instructions, a bus, a display, a speaker, and a processor capable of processing the set of computer instructions to perform any one or more of the methodologies herein, according to an embodiment herein.

FIG. 17 illustrates an exploded view of a receiver 1700 having a memory 1702 having a set of computer instructions, a bus 1704, a display 1706, a speaker 1708, and a processor 1710 capable of processing the set of computer instructions to perform any one or more of the methodologies herein, according to an embodiment herein. The processor 1710 may also enable digital content to be consumed in the form of video for output via one or more displays 1706 or audio for output via speaker 1708 and/or earphones. The processor 1710 may also carry out the methods described herein and in accordance with the embodiments herein. Digital content may also be stored in the memory 1702 for future processing or consumption. The memory 1702 may also store program specific information and/or service information (PSI/SI), including information about digital content (e.g., the detected information bits) available in the future or stored from the past.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A vector slot processor that is capable of supporting multiple signal processing operations for multiple demodulation standards, said vector slot processor comprising:

a plurality of micro execution slots (MESs) that perform said multiple signal processing operations on high speed streaming inputs, wherein each of said plurality of MESs comprises:

at least one N-way signal register that receives said high speed streaming inputs, wherein said at least one N-way signal register comprises individual indexes from 1 to N inside each of said plurality of MES, and wherein said individual indexes from 1 to N enable implementing N-slices of said at least one N-way signal register, wherein N is greater than 1;

at least one N-way coefficient register that stores filter coefficients for said multiple signal processing operations, wherein said at least one N-way coefficient register comprises individual indexes from 1 to N inside each of said plurality of MES, and wherein said individual indexes from 1 to N enable implementing N-slices of said at least one N-way coefficient register; and at least one N-way Multiply and Accumulate (MAC) unit that (i) receives said high speed streaming inputs from said at least one N-way signal register, (ii) receives said filter coefficients from said at least one N-way coefficient register and (iii) performs (a) a vertical MAC (VRMAC) operation and (b) a horizontal multiply and add (HRMAD) operation on said high speed streaming inputs based on said individual indexes, wherein said VRMAC operation comprises i) slice-wise multiplication of said high speed streaming input with said filter coefficients and ii)accumulation of said multiplied high speed streaming input from each of said N-slices of said at least one N-way signal register and said at least one N-way coefficient register for each of said plurality of MES; and wherein said HRMAD operation comprises i) slice-wise multiplication of said high speed streaming input from each of said N-slices of said at least one N-way signal register with said filter coefficients for each of said plurality of MES and ii)addition of said multiplied outputs of said plurality of MES; and a programmable switch communicatively associated with said at least one N-way signal register and operable to form a plurality of programmable interconnections between said at least one N-way signal registers to control a shifting of said high speed streaming inputs across said plurality of MESs simultaneously based on said programmable interconnections;

wherein said programmable switch is operable for individual selection of one or more of said N-slices of said at least one N-way signal register and simultaneously shifting said N-slices of said at least one N-way signal register for performing a signal processing operation from among said multiple signal processing operations.

2. The vector slot processor of claim 1, wherein each of said plurality of MESs further comprises:

at least one N-way extended precision accumulator (ACC) that receives and stores an output of said at least one N-way MAC unit; and at least one n way N-way scaled accumulator (SACC) that (i) receives data from said at least one N-way ACC and (ii) stores said data after performing a scale-down operation and a rounding operation on said data.

3. The vector slot processor of claim 1, wherein said N-slices of each of said at least one N-way signal register and said at least one N-way coefficient register and said individual indexes from 1 to N, enable operation of said at least one N-way signal register and said at least one N-way coefficient register as both a scalar register and a vector register.

4. The vector slot processor of claim 1, wherein a width of said at least one N-way signal register and a width of said at least one N-way coefficient register are scaled with said at least one N-way Multiply and Accumulate (MAC) unit.

5. The vector slot processor of claim 1, wherein a width of said at least one N-way signal register and said width of said at least one N-way coefficient register are extendible based on a number of said plurality of micro execution slots (MES).

6. The vector slot processor of claim 1, further comprising:
a plurality of buffer registers that are interconnected with said at least one N-way signal register and across said plurality of MESs through said programmable switch, wherein a vector instruction for said vector slot processor is stored in a program memory of a CPU.

7. The vector slot processor of claim 6, wherein said plurality of MESs comprises: (a) a first MES that executes a first operand of said vector instruction; and (b) a second MES that executes a second operand of said vector instruction, wherein said first operand and said second operand are executed concurrently.

8. The vector slot processor of claim 7, wherein a format of said vector instruction comprises a field that stores a programmable binary value and wherein at least one clock of said plurality of MESs is disabled or enabled based on said programmable binary value.

* * * * *